(12) United States Patent
Dubois

(10) Patent No.: US 9,429,366 B2
(45) Date of Patent: Aug. 30, 2016

(54) ENERGY RECOVERY VENTILATION SULFONATED BLOCK COPOLYMER LAMINATE MEMBRANE

(75) Inventor: Donn Dubois, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 765 days.

(21) Appl. No.: 12/893,163

(22) Filed: Sep. 29, 2010

(65) Prior Publication Data

US 2012/0073791 A1    Mar. 29, 2012

(51) Int. Cl.
*F28F 3/00*    (2006.01)
*F28D 7/00*    (2006.01)
(Continued)

(52) U.S. Cl.
CPC ........... *F28D 9/0025* (2013.01); *B01D 53/228* (2013.01); *B01D 67/0002* (2013.01); *B01D 69/12* (2013.01); *B01D 71/80* (2013.01); *B01D 71/82* (2013.01); *B32B 3/085* (2013.01); *B32B 3/28* (2013.01); *B32B 27/00* (2013.01); *B32B 27/12* (2013.01); *B32B 27/28* (2013.01); *B32B 27/302* (2013.01); *F24F 12/006* (2013.01); *F28D 9/0062* (2013.01); *F28D 21/0015* (2013.01); *B01D 71/28* (2013.01); *B32B 2250/40* (2013.01); *B32B 2250/42* (2013.01); *B32B 2262/0284* (2013.01); *B32B 2270/00* (2013.01); *B32B 2307/7242* (2013.01); *F24F 2003/1435* (2013.01); *Y02B 30/563* (2013.01)

(58) Field of Classification Search
CPC ............... F28D 9/0025; F28D 9/0062; F28D 21/0015; B32B 27/12; B32B 3/085; B32B 27/28; B32B 27/302; B01D 71/80; B01D 53/228; B01D 69/12; B01D 71/82; B01D 67/0002

USPC ........... 165/138, 166, 167, 159; 96/9, 11, 12
See application file for complete search history.

(56) References Cited

U.S. PATENT DOCUMENTS 2,702,580 A * 2/1955 Buteman ....................... 442/236
2,854,425 A    9/1958 Bogel et al.
(Continued)

FOREIGN PATENT DOCUMENTS

CA    716645    8/1965
CA    2377553 A1    2/2001
(Continued)

OTHER PUBLICATIONS

Dictionary.com, definition of Laminate.*
(Continued)

*Primary Examiner* — Frantz Jules
*Assistant Examiner* — Claire Rojohn, III
(74) *Attorney, Agent, or Firm* — Ekatherina Serysheva

(57) ABSTRACT

A core unit for an energy recovery system for exchanging heat and vapor between two independent intake and exhaust airstreams without intermixing thereof, the core unit having a fibrous microporous support substrate and a sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units, and wherein the sulfonated block copolymer is laminated on the microporous support substrate.

21 Claims, 4 Drawing Sheets

(51) Int. Cl.

| | | |
|---|---|---|
| *F28F 7/00* | (2006.01) | |
| *F28D 9/00* | (2006.01) | |
| *B01D 53/22* | (2006.01) | |
| *B01D 67/00* | (2006.01) | |
| *B01D 69/12* | (2006.01) | |
| *B01D 71/80* | (2006.01) | |
| *B01D 71/82* | (2006.01) | |
| *B32B 27/00* | (2006.01) | |
| *F24F 12/00* | (2006.01) | |
| *F28D 21/00* | (2006.01) | |
| *B32B 27/12* | (2006.01) | |
| *B32B 27/28* | (2006.01) | |
| *B32B 27/30* | (2006.01) | |
| *B32B 3/08* | (2006.01) | |
| *B32B 3/28* | (2006.01) | |
| *F24F 3/14* | (2006.01) | |
| *B01D 71/28* | (2006.01) | |

(56) References Cited

U.S. PATENT DOCUMENTS

| | | |
|---|---|---|
| 3,281,257 A | 10/1966 | Shy |
| 3,450,795 A | 6/1969 | Langer et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,682,768 A | 8/1972 | Adams et al. |
| 3,700,633 A | 10/1972 | Wald et al. |
| 3,735,559 A | 5/1973 | Salemme |
| 3,783,072 A | 1/1974 | Korpman |
| 3,985,830 A | 10/1976 | Fetters et al. |
| 4,039,593 A | 8/1977 | Kamienski et al. |
| 4,107,236 A | 8/1978 | Naylor et al. |
| 4,207,364 A | 6/1980 | Nyberg |
| 4,313,867 A | 2/1982 | Duvdevani |
| 4,365,023 A | 12/1982 | Fujimoto |
| 4,391,949 A | 7/1983 | St. Clair |
| 4,444,953 A | 4/1984 | St. Clair |
| 4,678,025 A | 7/1987 | Oberlander et al. |
| 4,728,429 A | 3/1988 | Cabasso et al. |
| 4,766,161 A | 8/1988 | Chlanda et al. |
| 4,797,318 A | 1/1989 | Brooker et al. |
| 4,931,070 A | 6/1990 | Prasad |
| 4,934,148 A | 6/1990 | Prasad et al. |
| 4,944,776 A | 7/1990 | Keyser et al. |
| 4,946,899 A | 8/1990 | Kennedy et al. |
| 5,095,054 A | 3/1992 | Lay et al. |
| 5,145,748 A | 9/1992 | Gaidis et al. |
| 5,239,010 A | 8/1993 | Balas et al. |
| 5,288,773 A | 2/1994 | Gorbaty et al. |
| 5,340,387 A | 8/1994 | Smith |
| 5,348,691 A | 9/1994 | McElroy et al. |
| 5,389,711 A | 2/1995 | Westbrook et al. |
| 5,468,574 A | 11/1995 | Ehrenberg et al. |
| 5,516,831 A * | 5/1996 | Pottick et al. ............ 524/474 |
| 5,620,500 A | 4/1997 | Fukui et al. |
| 5,677,074 A | 10/1997 | Serpico et al. |
| 5,679,482 A | 10/1997 | Ehrenberg et al. |
| 5,679,745 A | 10/1997 | Hamada et al. |
| 5,709,921 A | 1/1998 | Shawer |
| 5,785,117 A | 7/1998 | Grinbergs |
| 5,840,387 A | 11/1998 | Berlowitz-Tarrant et al. |
| 6,033,804 A | 3/2000 | Doyle et al. |
| 6,110,616 A | 8/2000 | Sheikh-Ali et al. |
| 6,145,588 A | 11/2000 | Martin et al. |
| 6,306,419 B1 | 10/2001 | Vachon et al. |
| 6,391,981 B1 | 5/2002 | Willis et al. |
| 6,413,298 B1 | 7/2002 | Wnek et al. |
| 6,444,767 B1 | 9/2002 | Schade et al. |
| 6,455,651 B1 | 9/2002 | Willis et al. |
| 6,492,469 B2 | 12/2002 | Willis et al. |
| 6,515,083 B2 | 2/2003 | Ozawa et al. |
| 6,536,514 B1 | 3/2003 | Sugiyama et al. |
| 6,579,948 B1 | 6/2003 | Tan et al. |
| 6,664,309 B2 | 12/2003 | Svenningsen et al. |
| 6,664,340 B1 | 12/2003 | Kaerki et al. |
| 6,684,943 B2 | 2/2004 | Dobbs et al. |
| 6,686,423 B1 | 2/2004 | Desbois et al. |
| 6,699,941 B1 | 3/2004 | Handlin et al. |
| 6,703,446 B2 | 3/2004 | Schwindeman et al. |
| 6,716,777 B2 | 4/2004 | Lin |
| 6,767,976 B2 | 7/2004 | Hamada et al. |
| 6,777,082 B2 | 8/2004 | Patel et al. |
| 6,838,391 B2 | 1/2005 | Harle |
| 6,841,601 B2 | 1/2005 | Serpico et al. |
| 7,029,559 B2 | 4/2006 | Won et al. |
| 7,060,788 B2 | 6/2006 | Hucks et al. |
| 7,152,670 B2 | 12/2006 | Dobbs et al. |
| 7,160,551 B2 | 1/2007 | McHugh et al. |
| 7,169,848 B2 | 1/2007 | Bening et al. |
| 7,179,860 B2 | 2/2007 | Cao et al. |
| 7,188,666 B2 | 3/2007 | Lee et al. |
| 7,228,891 B2 | 6/2007 | Shin et al. |
| 7,231,967 B2 | 6/2007 | Haglid |
| 7,307,127 B1 * | 12/2007 | Napadensky et al. ........ 525/353 |
| 7,309,522 B2 | 12/2007 | Webb et al. |
| 7,312,292 B2 | 12/2007 | Ravikiran |
| 7,320,361 B2 | 1/2008 | Arai et al. |
| 7,323,265 B2 | 1/2008 | Fan et al. |
| 7,598,337 B2 | 10/2009 | Hung et al. |
| 7,601,785 B2 | 10/2009 | Chang et al. |
| 7,740,968 B2 | 6/2010 | Yamashita et al. |
| 7,754,844 B2 | 7/2010 | Sakaguchi et al. |
| 7,807,759 B2 | 10/2010 | Shin et al. |
| 7,851,575 B2 | 12/2010 | Ravikiran |
| 7,977,713 B2 | 7/2011 | Sankin et al. |
| 8,012,539 B2 | 9/2011 | Handlin et al. |
| 8,445,631 B2 * | 5/2013 | Willis ................ C08G 85/004 |
| | | 525/333.5 |
| 2001/0053475 A1 | 12/2001 | Ying et al. |
| 2003/0049511 A1 | 3/2003 | Ritts et al. |
| 2003/0106680 A1 | 6/2003 | Serpico et al. |
| 2003/0129469 A1 | 7/2003 | Sun et al. |
| 2003/0198858 A1 | 10/2003 | Sun et al. |
| 2003/0228681 A1 | 12/2003 | Ritts et al. |
| 2004/0005490 A1 | 1/2004 | Fan et al. |
| 2004/0029014 A1 | 2/2004 | Hwang et al. |
| 2004/0101753 A1 | 5/2004 | Hwang |
| 2004/0137813 A1 | 7/2004 | Faucher |
| 2004/0140085 A1 * | 7/2004 | Dobbs et al. ................ 165/166 |
| 2004/0142910 A1 | 7/2004 | Vachon et al. |
| 2004/0234851 A1 | 11/2004 | Kim et al. |
| 2005/0061381 A1 | 3/2005 | Hosoi |
| 2005/0133204 A1 | 6/2005 | Gates et al. |
| 2005/0266290 A1 | 12/2005 | Sun et al. |
| 2006/0113070 A1 | 6/2006 | Lee et al. |
| 2006/0154126 A1 | 7/2006 | Ritts et al. |
| 2007/0021569 A1 * | 1/2007 | Willis et al. ................ 525/314 |
| 2008/0032114 A1 * | 2/2008 | Squires et al. ............ 428/308.4 |
| 2008/0085437 A1 | 4/2008 | Dean et al. |
| 2008/0124563 A1 | 5/2008 | Shima |
| 2008/0283217 A1 * | 11/2008 | Gagnon et al. ................ 165/54 |
| 2008/0305251 A1 | 12/2008 | Fukuta et al. |
| 2009/0123804 A1 | 5/2009 | Yamashita et al. |
| 2009/0126370 A1 | 5/2009 | Tsai |
| 2009/0246593 A1 | 10/2009 | Nowatari et al. |
| 2009/0263699 A1 | 10/2009 | Sadasue et al. |
| 2009/0280255 A1 * | 11/2009 | Handlin, Jr. ............ C08F 6/006 |
| | | 427/358 |
| 2009/0314480 A1 | 12/2009 | Grinbergs et al. |
| 2010/0031817 A1 | 2/2010 | Ehrenberg et al. |
| 2010/0048817 A1 | 2/2010 | Dado et al. |
| 2010/0087783 A1 | 4/2010 | Weber et al. |
| 2010/0159353 A1 | 6/2010 | Ohgi et al. |
| 2010/0167100 A1 | 7/2010 | Moore et al. |
| 2010/0167159 A1 | 7/2010 | Ono et al. |
| 2010/0170776 A1 | 7/2010 | Ehrenberg et al. |
| 2010/0204403 A1 | 8/2010 | Willis et al. |
| 2010/0233569 A1 | 9/2010 | Ono et al. |
| 2010/0261799 A1 | 10/2010 | Vachon et al. |
| 2010/0264369 A1 | 10/2010 | Zhang |

(56) References Cited

U.S. PATENT DOCUMENTS

| | | | |
|---|---|---|---|
| 2010/0273901 A1 | 10/2010 | Ehrenberg et al. | |
| 2011/0230614 A1 | 9/2011 | Handlin et al. | |
| 2011/0268901 A1 | 11/2011 | Handlin et al. | |

FOREIGN PATENT DOCUMENTS

| | | |
|---|---|---|
| CA | 2616250 A1 | 1/2007 |
| DE | 3930217 A1 | 3/1991 |
| DE | 19728686 C1 | 4/1999 |
| FR | 2662604 A2 | 12/1991 |
| GB | 419604 A | 11/1934 |
| GB | 949126 A | 2/1956 |
| GB | 1019847 A | 10/1963 |
| GB | 1144167 A | 3/1969 |
| GB | 1336764 A | 11/1973 |
| GB | 1380411 A | 1/1975 |
| GB | 2066267 A | 7/1981 |
| GB | 2107325 A | 4/1983 |
| GB | 2168648 A | 6/1986 |
| GB | 2272220 A | 5/1994 |
| GB | 2399787 A | 9/2004 |
| GB | 2434762 A | 8/2007 |
| GB | 2444242 A | 6/2008 |
| JP | 53136082 A | 11/1978 |
| JP | 1256583 A | 10/1989 |
| JP | 1559652 C | 5/1990 |
| JP | 4053885 A | 2/1992 |
| JP | 5303918 A | 11/1993 |
| JP | 6000923 A | 1/1994 |
| JP | 7018237 A | 1/1995 |
| JP | 1910228 C | 3/1995 |
| JP | 1914163 C | 3/1995 |
| JP | 7060907 A | 3/1995 |
| JP | 7082428 A | 3/1995 |
| JP | 1926012 C | 4/1995 |
| JP | 2549576 B2 | 10/1996 |
| JP | 9074273 A | 3/1997 |
| JP | 9078431 A | 3/1997 |
| JP | 9094925 A | 4/1997 |
| JP | 9156009 A | 6/1997 |
| JP | 9217046 A | 8/1997 |
| JP | 9235524 A | 9/1997 |
| JP | 9277478 A | 10/1997 |
| JP | 10061057 A | 3/1998 |
| JP | 10110150 A | 4/1998 |
| JP | 10158454 A | 6/1998 |
| JP | 10298514 A | 11/1998 |
| JP | 2837435 B2 | 12/1998 |
| JP | 2843947 B2 | 1/1999 |
| JP | 2868391 B2 | 3/1999 |
| JP | 3704906 B2 | 3/1999 |
| JP | 11080681 A | 3/1999 |
| JP | 11158299 A | 6/1999 |
| JP | 11199839 A | 7/1999 |
| JP | 2000033671 A | 2/2000 |
| JP | 2000038550 A | 2/2000 |
| JP | 2000136367 A | 5/2000 |
| JP | 2000318102 A | 11/2000 |
| JP | 2000345120 A | 12/2000 |
| JP | 2001020169 A | 1/2001 |
| JP | 2001062968 A | 3/2001 |
| JP | 3164554 B2 | 5/2001 |
| JP | 3249005 B2 | 1/2002 |
| JP | 2002338918 A | 1/2002 |
| JP | 2004050612 A | 2/2002 |
| JP | 2002105424 A | 4/2002 |
| JP | 3326195 B2 | 9/2002 |
| JP | 3338179 B2 | 10/2002 |
| JP | 3358391 B2 | 12/2002 |
| JP | 3370198 B2 | 1/2003 |
| JP | 3411068 B2 | 5/2003 |
| JP | 3484840 B2 | 1/2004 |
| JP | 3515740 B2 | 4/2004 |
| JP | 2004121828 A | 4/2004 |
| JP | 2004136480 A | 5/2004 |
| JP | 3660771 B2 | 6/2005 |
| JP | 2006021959 A | 1/2006 |
| JP | 3787935 B2 | 6/2006 |
| JP | 2007001086 A | 1/2007 |
| JP | 3887341 B2 | 2/2007 |
| JP | 2007105134 A | 4/2007 |
| JP | 2007126512 A | 5/2007 |
| JP | 3940952 B2 | 7/2007 |
| JP | 3967842 B2 | 8/2007 |
| JP | 2007238746 A | 9/2007 |
| JP | 2008073888 B2 | 4/2008 |
| JP | 2008127447 A | 6/2008 |
| JP | 2009143998 A | 7/2009 |
| JP | 4327040 B2 | 9/2009 |
| JP | 4414016 B2 | 2/2010 |
| JP | 2010085585 A | 4/2010 |
| JP | 2010106090 A | 5/2010 |
| JP | 4544563 B2 | 9/2010 |
| KR | 20020076825 A | 10/2002 |
| KR | 20040013555 A | 2/2004 |
| TW | 201024346 A | 7/2010 |
| WO | 9821773 A1 | 5/1998 |
| WO | 0109239 A1 | 2/2001 |
| WO | 0272242 A1 | 1/2002 |
| WO | 03050896 A3 | 10/2002 |
| WO | 03050897 A3 | 10/2003 |
| WO | 2004004688 A1 | 1/2004 |
| WO | 2004051172 A1 | 6/2004 |
| WO | 2004032306 A3 | 7/2004 |
| WO | 2004070312 A1 | 8/2004 |
| WO | 2007010039 A1 | 1/2007 |
| WO | 2007010042 A1 | 1/2007 |
| WO | 2008030939 A3 | 7/2008 |
| WO | 2008089332 A3 | 7/2008 |
| WO | 2011065460 A1 | 6/2011 |

OTHER PUBLICATIONS

Macromolecules Article, vol. 42, No. 16, 2009, High-Performance Carboxylated Polymers of Intrinsic Microporosity (PIMs) with Tunable Gas Transport Properties.*
PCT International Search Report dated Jan. 20, 2012.
Coates, Geoffrey W, Hustad, Phillip D., Reinartz, Stefan; Catalysts for the Living Insertion Polymerization of Alkenes: Access to New Polyolefin Architectures Using Ziegler-Natta Chemistry; Agnew. Chem. Int. Ed. 2002, 41, pp. 2236-2257.
Zhang, Hao and Nomura, Kotohiro, Living Copoolymerization of Ethylene with Styrene Catalyzed by (Cyclopentadienyl)(ketimide)titanium(IV) Complex-MAO Catalyst System, J. Am. Chem. Soc. 2005, 127, pp. 9364-9365.
Hawker, Craig J., Bosman, Anton W. Harth, Eva, New Polymer Synthesis by Nitroxide Mediated Living Radical Polymerizations, Chem. Rev. 2001, 101, pp. 3661-3688.
Taiwan Search Report dated Nov. 26, 2013.

* cited by examiner

ENERGY RECOVERY VENTILATION SULFONATED BLOCK COPOLYMER LAMINATE MEMBRANE

FIELD OF THE INVENTION

The present disclosure relates to a membrane for use in an energy recovery ventilation core unit. In particular, the present disclosure relates to a membrane made up of a microporous substrate laminated with a sulfonated block copolymer having at least at least two polymer end blocks that contain little or no sulfonic acid or sulfonate functionality and at least one polymer interior block which contains an effective amount of sulfonic acid or sulfonate functionality. The present disclosure further relates to an energy recovery ventilation unit having a core which employs such membranes.

BACKGROUND OF THE INVENTION

It is well known that heating and cooling systems are employed for temperature control of buildings and various housing. Often fresh air will be ushered from outside of the building or house while exhaust air from within will be returned outdoors. Generally, a large amount of energy is expended in such cooling and heating systems. One way to conserve the cost for this expenditure of energy is by exchanging some of the heat and moisture between the air streams as they are entering and exiting the structure.

Accordingly such systems for exchanging the heat and humidity of the air streams have come to be known as energy recovery ventilation (ERV) systems. ERV involves the sensible and latent heat exchange of exhaust inside air with fresh outdoor air. The basis for such exchange is that the exhaust air flow and the intake airflow will possess different water vapor pressures and will furthermore be at different temperatures. For example, in summer if the intake airflow is warm and humid, energy is recovered by exchanging both the sensible heat and the latent heat with the cool and low humidity exhaust air. Alternatively, in winter, if the outdoor air is cold and dry, energy is recovered by exchanging both the dry cold air with the warmer, more humid exhaust air.

ERV systems are usually employed in conjunction with a heating and/or cooling system, and are made up of a device having an ERV core unit. The core unit is generally comprised of various stacked membranes separated by some type of barrier. The intake and exhaust air streams are transported to the core unit and made to pass by one another without intermixture on each side of the stacked plates.

Sensible heat exchange is generally simpler to accomplish since a thin layer barrier may transfer heat rather easily. On the other hand, latent heat transfer is affected by the change in humidity between the air streams. Accordingly, what is needed therefore is a system that allows for both the efficient exchange of both sensible and latent heat of the various intake and exhaust air flows.

SUMMARY OF THE INVENTION

Latent heat is effected in large proportion by the change in humidity of the incoming and exiting air. Accordingly, latent heat transfer becomes in large degree a function of the ERV membrane's ability to transport water vapor between the two airflow streams.

What has been found and disclosed herein is an ERV system for the improved sensible and latent heat exchange between inflow and outflow air streams. This has been achieved by a membrane disclosed herein made up of a microporous substrate with a laminate having a sulfonated block copolymer. The sulfonated block copolymer has high water vapor transport rates, thus facilitating efficient latent heat exchange.

In some embodiments, disclosed herein is a laminate membrane for a core in an energy recovery system for the exchange of heat and moisture between air streams passing through the system, the membrane including:
  a fibrous microporous support substrate,
  a sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units,
  wherein the sulfonated block copolymer is laminated on the microporous support substrate, Furthermore, the membrane can include a spacer element interposed between itself and a second membrane, the spacer and the membrane forming a layer in an ERV core. In further embodiments, the core has a plurality of said layers stacked one upon the other.

In other embodiments, the microporous substrate is a fibrous woven or non-woven material. In further embodiments, the microporous substrate is selected from the group consisting of carbon, fiberglass, polyester, polyethylene, polyethylene terephthalate, cellulose, cellulose nitrate, cellulose acetate, nylon, polytetrafluoroethylene.

In some embodiments, the sulfonated block copolymer is heat laminated, solvent laminated or adhesive laminated onto the microporous support substrate. Furthermore, the sulfonated block copolymer laminate can be blended with additional hydrogenated and non-hydrogenated thermoplastic elastomeric styrenic block copolymers.

In other embodiments, each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof.

In other embodiments, each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

In other embodiments, the sulfonated block copolymer has the general configuration A-B-A, A-B-A-B-A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

In other embodiments, each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated In still other embodiments, disclosed herein is an energy recovery system having a core unit permitting heat and moisture exchange between at least two air streams, the core unit including:

a plurality of spacer elements arranged in a stacked configuration, the spacer elements forming air passageways configured for the flow of at least two independent air streams therethrough, a plurality of laminated membranes with the spacer interposed therebetween, the membranes being comprised of a laminated microporous fibrous substrate support, the laminate layer comprising a sulfonated block copolymer, the sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units of the B block.

In further embodiments, the passageways are made up of two sets of passageways with a first set arranged in a first direction and a second set arranged in a second direction different from said first direction thereby enabling the at least two independent air streams to have a cross-flow pattern.

In further embodiments, the spacer element is metal, fiberglass or plastic. Additionally, the microporous substrate can be fibrous woven or non-woven material. Furthermore, the microporous substrate is selected from the group consisting of carbon, fiberglass, polyester, polyethylene, polyethylene terephthalate, cellulose, cellulose nitrate, cellulose acetate, nylon, polytetrafluoroethylene. In other embodiments, the sulfonated block copolymer is heat laminated, solvent laminated or adhesive laminated on the microporous support substrate.

DETAILED DESCRIPTION OF THE INVENTION

A detailed description of embodiments of the present invention is disclosed herein; however, it is to be understood that the disclosed embodiments are merely exemplary, and that the invention may be embodied in various and alternative forms of the disclosed embodiments. Therefore, specific structural and functional details which are addressed in the embodiments disclosed herein are not to be interpreted as limiting, but merely as a basis for the claims and as a representative basis for teaching one skilled in the art to variously employ the present invention.

All publications, patent applications, and patents mentioned herein are incorporated by reference in their entirety. In the event of conflict, the present specification, including definitions, is intended to control.

Unless specifically stated otherwise, all technical terms used herein have the meaning as commonly understood by those skilled in the art.

Moreover, unless specifically stated otherwise, the following expressions as used herein are understood to have the following meanings.

Unless specifically stated otherwise, the expression "coated" or "coating" means the application or bonding of a polymer in solution or liquid form to a substrate or other material.

In contrast to "coated," unless specifically stated otherwise, the expression "lamination" means the application or bonding of a cast polymer membrane or polymer film to a substrate or other material.

Disclosed herein is an improved ERV system for the exchange of sensible and latent heat between an intake airflow stream and an exhaust airflow stream. ERV systems employ a core unit having a stack of multiple moisture permeable membranes separated by spacers. Both the intake airflow streams as well as the exiting airflow streams are transported to the ERV core unit. In the core unit, the air streams are separated by the membranes in the core unit as they flow past one another. In this way heat and moisture are exchanged between the two air streams.

Energy Recovery Ventilation Core Units

Figure 1:
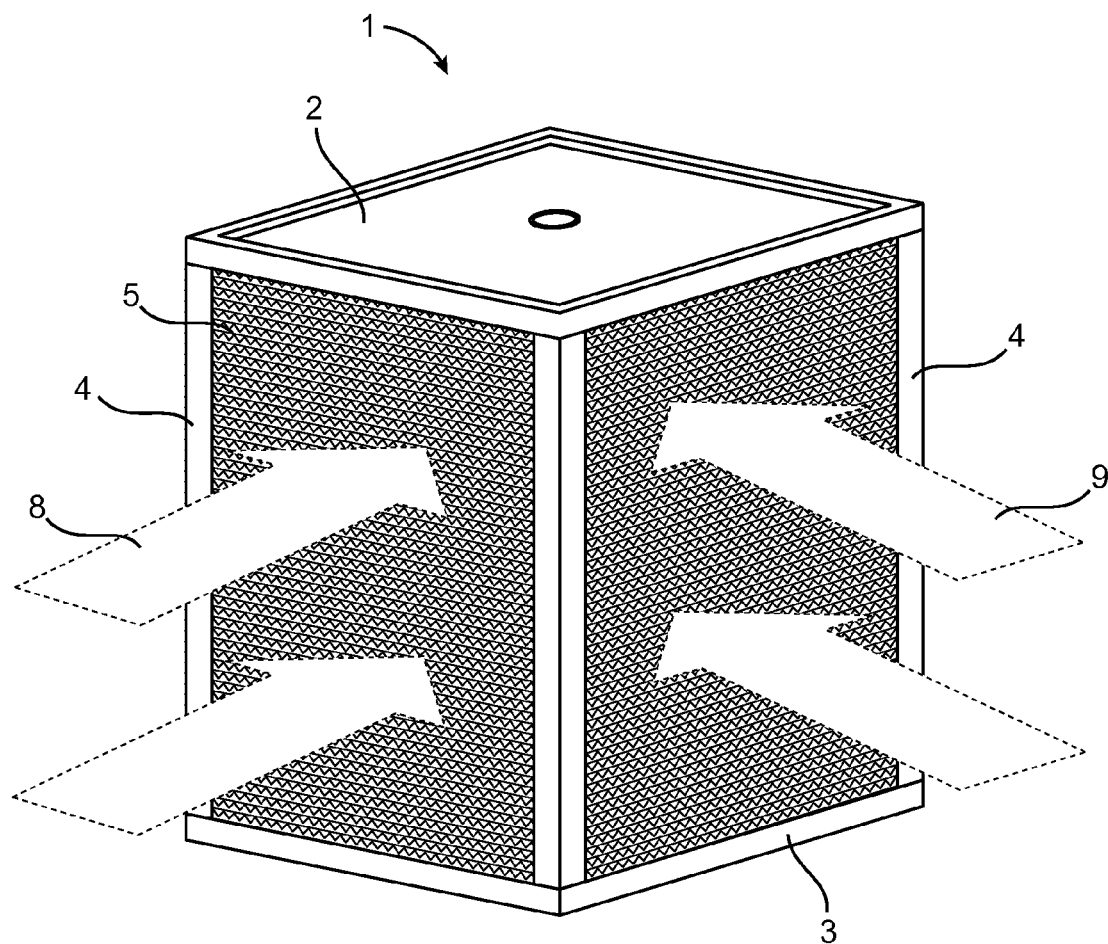
FIG. 1 illustrates a perspective view of an ERV core unit.

One embodiment of an ERV core unit 1 is shown in FIG. 1. As shown therein the unit has a housing made up of a top cover 2 and a bottom cover 3 with side supports 4. Within the housing is held exchange element 5 made up of a plurality of air exchange membranes separated by plurality spacer elements. In the embodiment shown, the fresh intake air flow is shown by arrow 8 and furthermore the exhaust air flow is shown by arrow 9.

Figure 2:
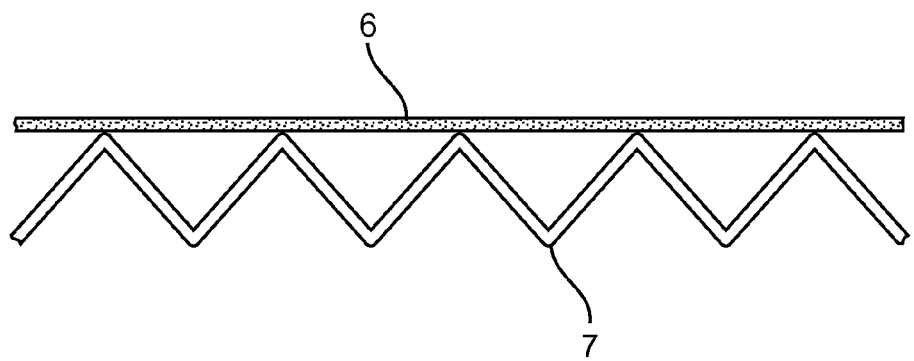
FIG. 2 illustrates an air exchange membrane with spacer element.

Referring now to FIG. 2, illustrated is air exchange membranes 6 with spacer elements 7 interposed therebetween. Spacer elements 7 are configured to provide channels for airflow between membranes 6. The size of such channels may be such as to provide an air gap from about 5 to 30 mm. In the embodiment shown in FIG. 2, this is done by forming the spacers 7 into a ridged formation. The crests thus form longitudinal apertures along the length of the spacers in one direction, thus permitting flow both above and below the spacer depending on the formation of the ridges. Such spacers may be made up of fiberglass, aluminum or plastic. Other materials may similarly be used which provide strength and maintain the membranes separated for permitting and directing airflow. The material should be such that both air and moisture is not permitted to pass through the spacers themselves.

Figure 3:
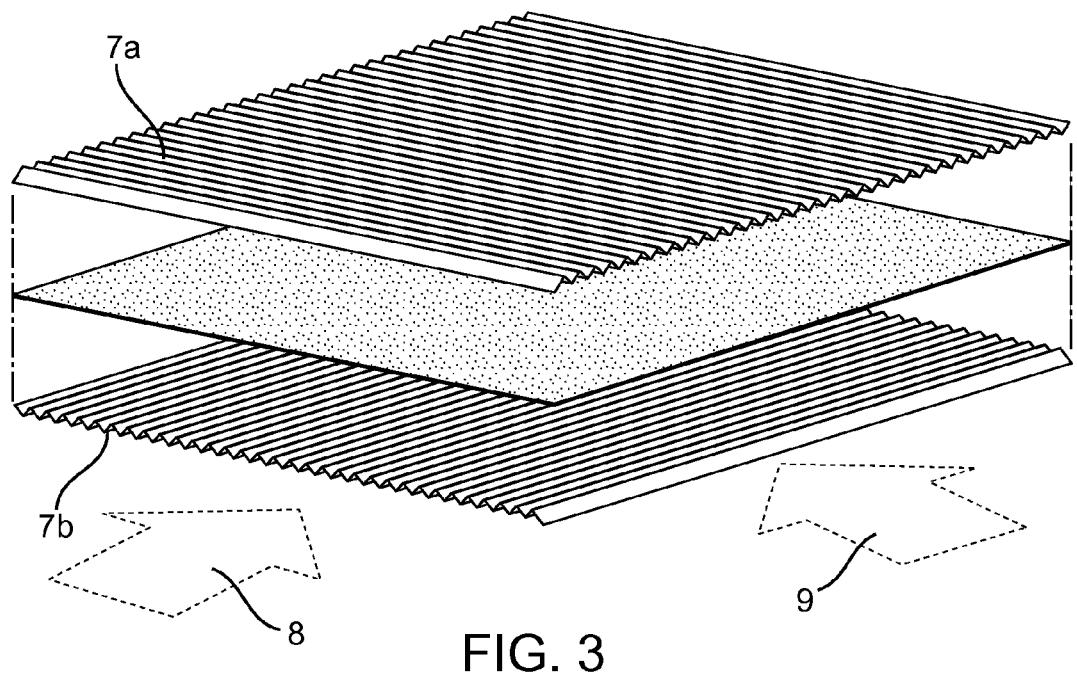
FIG. 3 illustrates spacer elements in a transverse configuration.

In the embodiment shown in FIG. 3, the spacers are ridged and arranged in a transverse configuration. In this example, one set of spacers 7a are arranged so that the air channels are aligned in one longitudinal direction, while a second set of spacers 7b are arranged such that the air channels are aligned in a second longitudinal direction, each set being stacked in alternating fashion. Accordingly, fresh intake air 8 may be passed through the spacer air channels in one direction, while the exhaust air 9 is passed through the spacer air channels in a second direction. Furthermore, as membranes are arranged on either side of the spacer elements 7, heat and moisture can be exchanged through the membrane without intermixture of the different air streams. While FIG. 3 illustrates the spacers 7a and 7b disassembled, FIG. 4 shows this arrangement of spacers stacked one on top of the other as they would be in a core unit (with membranes between each).

An example of ERV units have cores with ridged spacers are sold for example by Innergytech in their enthalpy heat exchanger units. Additionally, for example U.S. Pat. No. 6,536,514 discloses a ridged spacer with a moisture permeable membranes.

Figure 4:
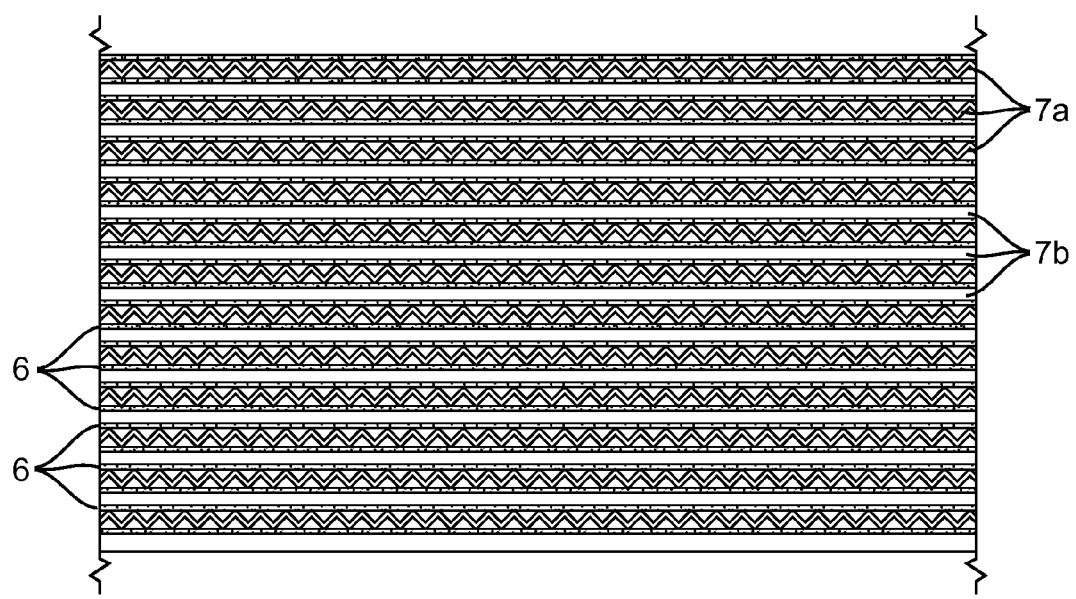
FIG. 4 illustrates an arrangement of stacked spacer elements.
Figure 5:
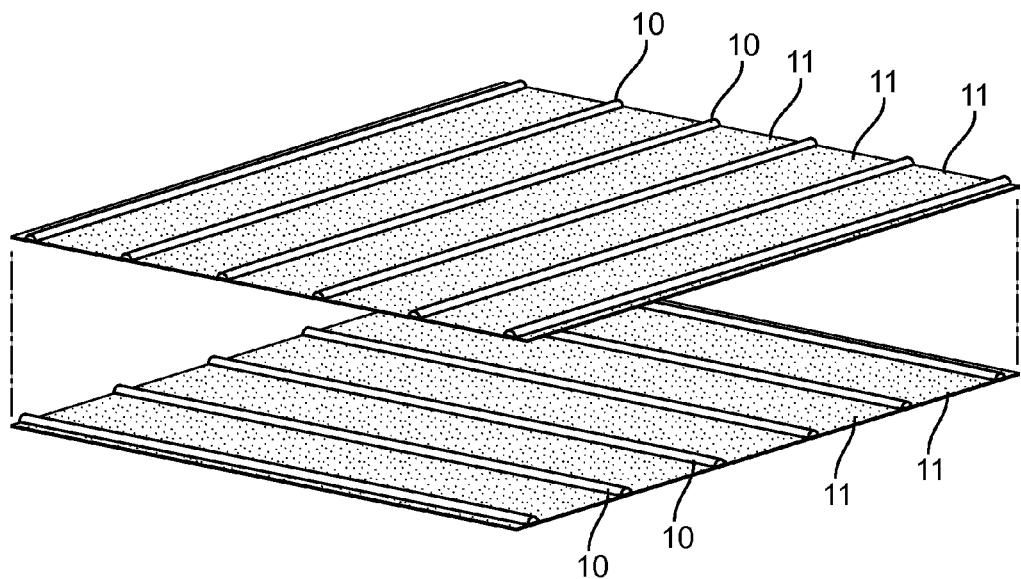
FIG. 5 illustrates spacers having elongate ribs.
Figure 6:
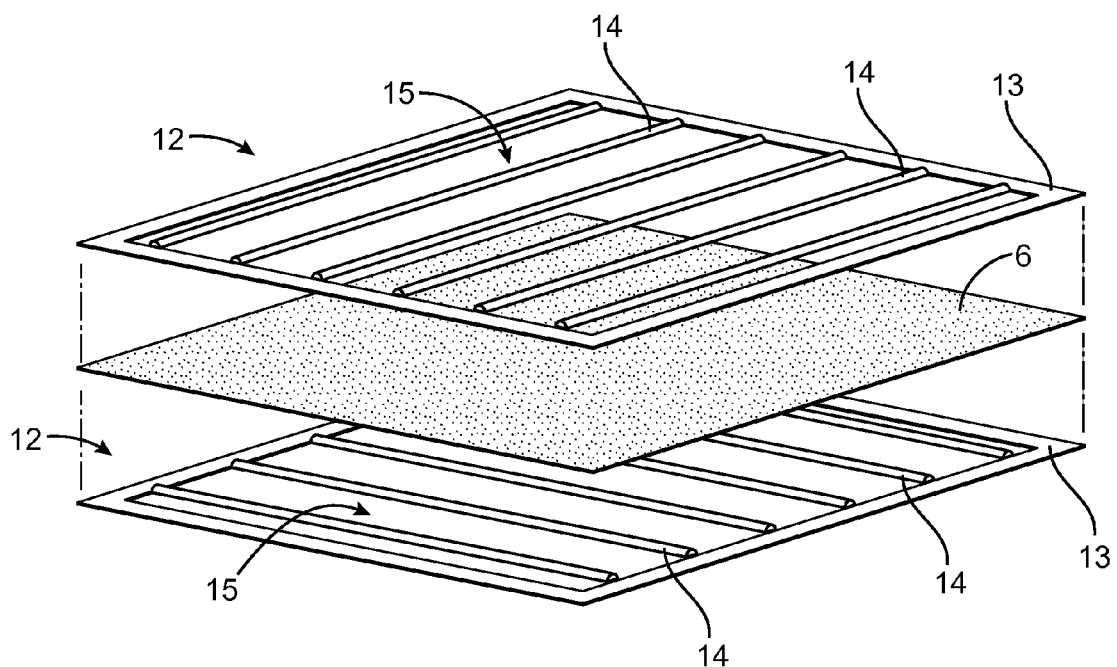
FIG. 6 illustrates spacers made up of plates.

While ridged spacers are illustrated in FIGS. 2-4, it will be understood that other types of spacers maybe used. For example, as shown in FIG. 5, instead of being ridged, the spacers may be made up of singular elongate ribs 10 adhered to the surface of membranes 11, which are which extend along the length of the core unit, with each successive layer alternating to form a cross flow pattern. In still other examples, as shown in FIG. 6, the spacers may be made up of a plate 12 which can be laid in between membranes. Such plates may have an outer frame 13, with longitudinal partitions 14 spaced a distance from one another. Such plates may be made up of fiberglass, aluminum or plastic. A membrane 6 is placed between plates 12, with plates 12 being stacked in an alternating cross flow pattern. For example in FIG. 6, the top plate extends in one direction while the lower plate extends in a second direction, which is perpendicular in the illustrative example. The partitions 14 form air channels 15 which direct the air streams flowing through the ERV unit. Apertures are placed in the side of the outer frame 13 to allow air flow in to the air channels 15.

Spacers such as that shown in FIGS. 2-6, may have configurations other than longitudinal, for example, they may be diagonal or jagged, or have other shapes. By adjusting the shape of the partitions the residence time of the air streams in the ERV core can be increased thereby improving heat and moisture exchange. Furthermore, such spacers can be stacked such that the intake and exhaust air streams have cross flows in any direction, for example transversely, right angles, or any non-parallel configuration. Further, parallel configurations can be employed as well if the gases can be prevented from being intermixed as they enter or exit the core.

Energy Recovery Ventilation Membranes

The spacers are provided in order to allow membrane surfaces to contact the intake and exhaust air flow streams in a non-parallel direction one on each side of a membrane without intermixture thereof. The membranes allow transfer of moisture between the air streams, and thus allowing sensible heat exchange. Accordingly, the ability to more efficiently transfer moisture greatly affects the effectiveness and efficiency of the ERV unit. As disclosed herein, it has been found a surprisingly improved ERV membrane having a polymer film laminated to a substrate for improved water vapor transport between the intake and exhaust gas streams a. Membrane Substrate The substrate is employed with the membrane to provide mechanical strength while additionally facilitating water vapor transport. Accordingly, it should be made of a porous material to allow moisture to pass through with as little resistance as possible while also providing structural integrity. The porous substrate may be those known and used in the art, many of which are commercially available.

Accordingly, the substrate to be used with the membrane disclosed herein includes porous cellulosic fibrous materials. Microporous films may also be used. Materials include, for example, fabrics, polymeric films and fibers, and cellulosic materials (such as paper). The substrate may be composed of natural and/or synthetic fibers. Fabrics include wovens, non-wovens, knits and cross-laid fabrics.

Further, the substrate may be composed of filaments, glass yarns, fiberglass, non-corroding metal fibers (such as nickel fibers), as well as well as carbon fibers. Synthetic fibers include polyolefins, polyethylene, polypropylene, and polyesters.

Exemplary substrates also include polyvinylidene fluoride, polytetrafluoroethylene, nylon, polyethersulfone, polypropylene, polyamide, cellulose, cellulose nitrate, cellulose acetate, cellulose nitrate/acetate polytetrafluoroethylene, Polyethylene Terephthalate (PET), and Polyether ether ketone (PEEK).

Additives or coatings (other than coating of the sulfonated polymer) may be added to the substrate to improve other properties. Such additives should not interfere with the effectiveness and efficiency of the ERV unit, or introduce any harmful components into the air streams. One type of additives is flame retardants which may be employed to inhibit or prevent fire or the spread of fire. For example, non-halogen flame retardants may be employed as well as phosphorus containing compounds. Halogen flame retardants may include bromine containing retardants. Other useful flame retardants known in the art may be used.

Biocides may also be applied, including fungicides, microbicides and bactericides, for preventing growth of molds, mildew, fungus, bacteria, viruses, and parasites as well as other biological organisms that may be harmful to humans or reduce the efficiency of the ERV unit.

Other additives may be added to the substrate to increase its strength, porosity and life, or reduce odor such as anti-oxidants, silica, alumina and zeolites.

b. Membrane Polymer

The membrane to be used in the ERV core disclosed herein is a polymeric film layer laminated onto a porous substrate. As disclosed herein, the polymeric film is composed of or includes a sulfonated block copolymer. It has been surprisingly found that the when the sulfonated block copolymer disclosed herein is laminated onto a porous substrate, water vapor transport, and thus latent heat exchange, is significantly improved. In some embodiments, the sulfonated block copolymers which are used in the polymer film layer include sulfonated block copolymers as described in US 2007/0021569 to Willis et al., the description of which is incorporated herein by reference in its entirety. Furthermore, the sulfonated block copolymers which include the sulfonated block copolymers as described in US 2007/0021569 may be prepared according to the process of WO 2008/089332 to Dado et al. which is hereby incorporated by reference in its entirety.

1. Sulfonated Block Copolymers

The block copolymers needed to prepare the sulfonated block copolymers may be made by a number of different processes, including anionic polymerization, moderated anionic polymerization, cationic polymerization, Ziegler-Natta polymerization, and living chain or stable free radical polymerization. Anionic polymerization is described below in more detail, and in the referenced documents. Moderated anionic polymerization processes for making styrenic block copolymers are disclosed, for example, in U.S. Pat. No. 6,391,981, U.S. Pat. No. 6,455,651 and U.S. Pat. No. 6,492,469, each of which is incorporated herein by reference. Cationic polymerization processes for preparing block copolymers are disclosed, for example, in U.S. Pat. No. 6,515,083 and U.S. Pat. No. 4,946,899, each of which is incorporated herein by reference.

Living Ziegler-Natta polymerization processes that can be used to make block copolymers were recently reviewed by G. W. Coates, P. D. Hustad, and S. Reinartz in Angew. Chem. Int. Ed., 41, 2236-2257 (2002); a subsequent publication by H. Zhang and K. Nomura (J. Am. Chem. Soc., Comm., 2005) describe living Ziegler-Natta techniques for making styrenic block copolymers specifically. The extensive work in the field of nitroxide mediated living radical polymerization chemistry has been reviewed; see C. J. Hawker, A. W. Bosman, and E. Harth, Chem. Rev., 101(12), 3661-3688 (2001). As outlined in this review, styrenic block copolymers can be synthesized by living or stable free radical techniques. Nitroxide mediated polymerization methods are preferred living chain or stable free radical polymerization processes when preparing the precursor polymers.

2. Polymer Structure

One aspect of the disclosure relates to the polymer structure of the sulfonated block copolymers. In one embodiment, the neutralized block copolymers have at least two polymer end or outer blocks A and at least one saturated polymer interior block B wherein each A block is a polymer block which is resistant to sulfonation and each B block is a polymer block which is susceptible to sulfonation.

Preferred block copolymer structures have the general configuration A-B-A, (A-B)n(A), (A-B-A)n, (A-B-A)nX, (A-B)nX, A-B-D-B-A, A-D-B-D-A, (A-D-B)n(A), (A-B-D)n(A), (A-B-D)nX, (A-D-B)nX or mixtures thereof, where n is an integer from 2 to about 30, X is coupling agent residue and A, B and D are as defined hereinafter.

Most preferred structures are linear structures such as A-B-A, (A-B)2X, A-B-D-B-A, (A-B-D)2X, A-D-B-D-A, and (A-D-B)2X and radial structures such as (A-B)nX and (A-D-B)nX where n is 3 to 6. Such block copolymers are typically made via anionic polymerization, stable free radical polymerization, cationic polymerization or Ziegler-Natta polymerization. Preferably, the block copolymers are made via anionic polymerization. It will be understood by those skilled in the art that in any polymerization, the polymer mixture will include a certain amount of A-B diblock copolymer, in addition to any linear and/or radial polymers. The respective amounts have not been found to be detrimental.

The A blocks are one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. If the A segments are polymers of 1,3-cyclodiene or conjugated dienes, the segments will be hydrogenated subsequent to polymerization of the block copolymer and before sulfonation of the block copolymer.

The para-substituted styrene monomers are selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures of the above monomers. Preferred para-substituted styrene monomers are para-t-butylstyrene and para-methylstyrene, with para-t-butylstyrene being most preferred. Monomers may be mixtures of monomers, depending on the particular source. It is desired that the overall purity of the para-substituted styrene monomers be at least 90%-wt., preferably at least 95%-wt., and even more preferably at least 98%-wt. of the desired para-substituted styrene monomer.

When the A blocks are polymer segments of ethylene, it may be useful to polymerize ethylene via a Ziegler-Natta process, as taught in the references in the review article by G. W. Coates et al, as cited above, which disclosure is herein incorporated by reference. It is preferred to make the ethylene blocks using anionic polymerization techniques as taught in U.S. Pat. No. 3,450,795, which disclosure is herein incorporated by reference. The block molecular weight for such ethylene blocks will typically be between about 1,000 and about 60,000.

When the A blocks are polymers of alpha olefins of 3 to 18 carbon atoms, such polymers are prepared by via a Ziegler-Natta process, as taught in the references in the above-cited review article by G. W. Coates et al. Preferably, the alpha-olefins are propylene, butylene, hexene and octane, with propylene being most preferred. The block molecular weight for each of such alpha-olefin blocks typically is between about 1,000 and about 60,000.

When the A blocks are hydrogenated polymers of 1,3-cyclodiene monomers, such monomers are selected from the group consisting of 1,3-cyclohexadiene, 1,3-cycloheptadiene and 1,3-cyclooctadiene. Preferably, the cyclodiene monomer is 1,3-cyclohexadiene. Polymerization of such cyclodiene monomers is disclosed in U.S. Pat. No. 6,699,941, which disclosure is herein incorporated by reference. It will be necessary to hydrogenate the A blocks when using cyclodiene monomers since non-hydrogenated polymerized cyclodiene blocks are susceptible to sulfonation. Accordingly, after synthesis of the A block with 1,3-cyclodiene monomers, the block copolymer will be hydrogenated.

When the A blocks are hydrogenated polymers of conjugated acyclic dienes having a vinyl content less than 35 mol percent prior to hydrogenation, it is preferred that the conjugated diene is 1,3-butadiene. It is necessary that the vinyl content of the polymer prior to hydrogenation be less than 35 mol percent, preferably less than 30 mol percent. In certain embodiments, the vinyl content of the polymer prior to hydrogenation will be less than 25 mol percent, even more preferably less than 20 mol percent, and even less than 15 mol percent with one of the more advantageous vinyl contents of the polymer prior to hydrogenation being less than 10 mol percent. In this way, the A blocks will have a crystalline structure, similar to that of polyethylene. Such A block structures are disclosed in U.S. Pat. No. 3,670,054 and in U.S. Pat. No. 4,107,236, each of which disclosures is herein incorporated by reference.

The A blocks may also be polymer segments of acrylic esters or methacrylic esters. Such polymer blocks may be made according to the methods disclosed in U.S. Pat. No. 6,767,976, which disclosure is herein incorporated by reference. Specific examples of the methacrylic ester include esters of a primary alcohol and methacrylic acid, such as methyl methacrylate, ethyl methacrylate, propyl methacrylate, n-butyl methacrylate, isobutyl methacrylate, hexyl methacrylate, 2-ethylhexyl methacrylate, dodecyl methacrylate, lauryl methacrylate, methoxyethyl methacrylate, dimethylaminoethyl methacrylate, diethylaminoethyl methacrylate, glycidyl methacrylate, trimethoxysilylpropyl methacrylate, trifluoromethyl methacrylate, trifluoroethyl methacrylate; esters of a secondary alcohol and methacrylic acid, such as isopropyl methacrylate, cyclohexyl methacrylate and isobornyl methacrylate; and esters of a tertiary alcohol and methacrylic acid, such as tert-butyl methacrylate. Specific examples of the acrylic ester include esters of a primary alcohol and acrylic acid, such as methyl acrylate, ethyl acrylate, propyl acrylate, n-butyl acrylate, isobutyl acrylate, hexyl acrylate, 2-ethylhexyl acrylate, dodecyl acrylate, lauryl acrylate, methoxyethyl acrylate, dimethylaminoethyl acrylate, diethylaminoethyl acrylate, glycidyl acrylate, trimethoxysilylpropyl acrylate, trifluoromethyl acrylate, trifluoroethyl acrylate; esters of a secondary alcohol and acrylic acid, such as isopropyl acrylate, cyclohexyl acrylate and isobornyl acrylate; and esters of a tertiary alcohol and acrylic acid, such as tert-butyl acrylate. If necessary, as raw material or raw materials, one or more of other anionic polymerizable monomers may be used together with the (meth)acrylic ester. Examples of the anionic polymerizable monomer that can be optionally used include methacrylic or acrylic monomers such as trimethylsilyl methacrylate, N—,N-dimethylmethacrylamide, N,N-diisopropylmethacrylamide, N,N-diethylmethacrylamide, N,N-methylethylmethacrylamide, N,N-di-tert-butylmethacrylamide, trimethylsilyl acrylate, N,N-dimethylacrylamide, N,N-diisopropylacrylamide, N,N-methylethylacrylamide and N,N-di-tert-butylacrylamide. Moreover, there may be used a multifunctional anionic polymerizable monomer having in the molecule thereof two or more methacrylic or acrylic structures, such as methacrylic ester structures or acrylic ester structures (for example, ethylene glycol diacrylate, ethylene glycol dimethacrylate, 1,4-butanediol diacrylate, 1,4-butanediol dimethacrylate, 1,6-hexanediol diacrylate, 1,6-hexanediol dimethacrylate, trimethylolpropane triacrylate and trimethylolpropane trimethacrylate).

In the polymerization processes used to make the acrylic or methacrylic ester polymer blocks, only one of the monomers, for example, the (meth)acrylic ester may be used, or two or more thereof may be used in combination. When two or more of the monomers are used in combination, any copolymerization form selected from random, block, tapered block and the like copolymerization forms may be effected by selecting conditions such as a combination of the monomers and the timing of adding the monomers to the polymerization system (for example, simultaneous addition of two or more monomers, or separate additions at intervals of a given time).

The A blocks may also contain up to 15 mol percent of the vinyl aromatic monomers such as those present in the B blocks which are addressed in more detail in the following. In some embodiments, the A blocks may contain up to 10 mol percent, preferably they will contain only up to 5 mol percent, and particularly preferably only up to 2 mol percent of the vinyl aromatic monomers as mentioned for the B blocks. However, in the most preferred embodiments, the A blocks will contain no vinyl monomers as present in the B blocks. The sulfonation level in the A blocks may be from 0 up to 15 mol percent of the total monomers in the A block. It will be understood by those skilled in the art that suitable ranges include any combination of the specified mol percents even if the specific combination and range is not listed herewith.

The B blocks, in each case, comprises segments of one or more polymerized vinyl aromatic monomers selected from unsubstituted styrene monomer, ortho-substituted styrene monomers, meta-substituted styrene monomers, alpha-methylstyrene monomer, 1,1-diphenylethylene monomer, 1,2-diphenylethylene monomer, and mixtures thereof. In addition to the monomers and polymers mentioned above, the B blocks may also comprise a partially or completely hydrogenated copolymer of such monomer(s) with a conjugated diene selected from 1,3-butadiene, isoprene and mixtures thereof, having a vinyl content of between 20 and 80 mol percent. These copolymers with partially or completely hydrogenated dienes may be random copolymers, tapered copolymers, block copolymers or controlled distribution copolymers. In one preferred embodiment, the B blocks are selectively partially or completely hydrogenated and comprise a copolymer of conjugated dienes and the vinyl aromatic monomers noted in this paragraph. In another preferred embodiment, the B blocks are unsubstituted styrene monomer blocks which are saturated by virtue of the nature of the monomer and do not require the added process step of hydrogenation. The B blocks having a controlled distribution structure are disclosed in U.S. Pat. No. 7,169,848, which disclosure is herein incorporated by reference. U.S. Pat. No. 7,169,848 also discloses the preparation of sulfonated block copolymers. The B blocks comprising a styrene block are described herein. In a preferred embodiment, the B blocks are made up of unsubstituted styrene and will not require a separate hydrogenation step.

In another aspect of the present disclosure, the block copolymer includes at least one impact modifier block D having a glass transition temperature less than 20° C. In one embodiment, the impact modifier block D comprises a hydrogenated polymer or copolymer of a conjugated diene selected from isoprene, 1,3-butadiene and mixtures thereof the butadiene portion of the polymer block having a vinyl content prior to hydrogenation of between 20 and 80 mol percent and the polymer block having a number average molecular weight of between 1,000 and 50,000. In another embodiment, the impact modifier block D comprises an acrylate or silicone polymer having a number average molecular weight of 1,000 to 50,000. In still another embodiment, the impact modifier block D block is a polymer block of isobutylene having a number average molecular weight of 1,000 to 50,000.

Each A block independently has a number average molecular weight between about 1,000 and about 60,000 and each B block independently has a number average molecular weight between about 10,000 and about 300,000. Preferably each A block has a number average molecular weight of between 2,000 and 50,000, more preferably between 3,000 and 40,000 and even more preferably between 3,000 and 30,000. Preferably each B block has a number average molecular weight of between 15,000 and 250,000, more preferably between 20,000 and 200,000, and even more preferably between 30,000 and 100,000. It will be understood by those skilled in the art that suitable ranges include any combination of the specified number average molecular weights even if the specific combination and range is not listed herewith. These molecular weights are most accurately determined by light scattering measurements, and are expressed as number average molecular weight. Preferably, the sulfonated polymers have from about 8 mol percent to about 80 mol percent, preferably from about 10 to about 60 mol percent A blocks, more preferably more than 15 mol percent A blocks and even more preferably from about 20 to about 50 mol percent A blocks.

The relative amount of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in the sulfonated block copolymer is from about 5 to about 90 mol percent, preferably from about 5 to about 85 mol percent. In alternative embodiments, the amount is from about 10 to about 80 mol percent, preferably from about 10 to about 75 mol percent, more preferably from about 15 to about 75 mol percent, with the most preferred being from about 25 to about 70 mol percent. It will be understood by those skilled in the art that suitable ranges include any combination of the specified mol percents even if the specific combination is not listed herewith.

In a preferred embodiment, the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block is from about 10 to about 100 mol percent, preferably from about 25 to about 100 mol percent, more preferably from about 50 to about 100 mol percent, even more preferably from about 75 to about 100 mol percent and most preferably 100 mol percent. It will be understood by those skilled in the art that suitable ranges include any combination of the specified mol percents even if the specific combination and range is not listed herewith.

Typical levels of sulfonation are such that each B block contains one or more sulfonic functional groups. Preferred levels of sulfonation are 10 to 100 mol percent based on the mol percent of vinyl aromatic monomers which are unsubstituted styrene monomer, ortho-substituted styrene monomer, meta-substituted styrene monomer, alpha-methylstyrene monomer, 1,1-diphenylethylene monomer, and 1,2-diphenylethylene monomer in each B block, more preferably about 20 to 95 mol percent and even more preferably about 30 to 90 mol percent. It will be understood by those skilled in the art that suitable ranges of sulfonation include any combination of the specified mol percents even if the specific combination and range is not listed herewith. The level of sulfonation is determined by titration of a dry polymer sample, which has been re-dissolved in tetrahydrofuran with a standardized solution of NaOH in a mixed alcohol and water solvent.

3. Overall Anionic Process to Prepare Polymers

The anionic polymerization process comprises polymerizing the suitable monomers in solution with a lithium initiator. The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogen atoms make particularly suitable solvents. Frequently used are cyclic alkanes, such as cyclopentane, cyclohexane, cycloheptane, and cyclooctane, all of which are relatively non-polar. Other suitable solvents will be known to those skilled in the art and can be selected to perform effectively in a given set of process conditions, with polymerization temperature being one of the major factors taken into consideration.

Starting materials for preparing the block copolymers of the present disclosure include the initial monomers noted above. Other important starting materials for anionic copolymerizations include one or more polymerization initiators. In the present disclosure suitable initiators include, for example, alkyl lithium compounds such as s-butyllithium, n-butyllithium, t-butyllithium, amyllithium and the like and other organo lithium compounds including di-initiators such as the di-sec-butyl lithium adduct of m-diisopropenyl benzene. Other such di-initiators are disclosed in U.S. Pat. No. 6,492,469, the disclosure of which is incorporated herein by reference. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. No. 4,039,593 and U.S. Re. 27,145, the disclosure of each of which is incorporated herein by reference.

Polymerization conditions to prepare the block copolymers of the present disclosure are typically similar to those used for anionic polymerizations in general. The polymerization is preferably carried out at a temperature of from about −30° C. to about 150° C., more preferably about 10° C. to about 100° C., and most preferably, in view of industrial limitations, from about 30° C. to about 90° C. The polymerization is carried out in an inert atmosphere, preferably under nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, and the molecular weight of the polymer that is desired. When two or more of the monomers are used in combination, any copolymerization form selected from random, block, tapered block, controlled distribution block, and the like copolymerization forms may be utilized.

It will be understood by those skilled in the art that the anionic polymerization process may be moderated by the addition of a Lewis acid, such as an aluminum alkyl, a magnesium alkyl, a zinc alkyl or combinations thereof. The effects of the added Lewis acid on the polymerization process are 1) to lower the viscosity of the living polymer solution allowing for a process that operates at higher polymer concentrations and thus uses less solvent,
2) to enhance the thermal stability of the living polymer chain end which permits polymerization at higher temperatures and again, reduces the viscosity of the polymer solution allowing for the use of less solvent, and
3) to slow the rate of reaction which permits polymerization at higher temperatures while using the same technology for removing the heat of reaction as had been used in the standard anionic polymerization process.

The processing benefits of using Lewis acids to moderate anionic polymerization techniques have been disclosed in U.S. Pat. No. 6,391,981, U.S. Pat. No. 6,455,651 and U.S. Pat. No. 6,492,469, the disclosure of each of which is herein incorporated by reference. Related information is disclosed in U.S. Pat. No. 6,444,767 and U.S. Pat. No. 6,686,423, the disclosure of each of which is incorporated herein by reference. The polymer made by such a moderated, anionic polymerization process can have the same structure as one prepared using the conventional anionic polymerization process and as such, this process can be useful in making the polymers of the present disclosure. For Lewis acid moderated, anionic polymerization processes, reaction temperatures between 100° C. and 150° C. are preferred as at these temperatures it is possible to take advantage of conducting the reaction at very high polymer concentrations. While a stoichiometric excess of the Lewis acid may be used, in most instances there is not sufficient benefit in improved processing to justify the additional cost of the excess Lewis acid. It is preferred to use from about 0.1 to about 1 mole of Lewis acid per mole of living, anionic chain ends to achieve an improvement in process performance with the moderated, anionic polymerization technique.

Preparation of radial (branched) polymers requires a post-polymerization step called "coupling". In the above radial formulas n is an integer of from 3 to about 30, preferably from about 3 to about 15, and more preferably from 3 to 6, and X is the remnant or residue of a coupling agent. A variety of coupling agents is known in the art and can be used in preparing the block copolymers. These include, for example, dihaloalkanes, silicon halides, siloxanes, multifunctional epoxides, silica compounds, esters of monohydric alcohols with carboxylic acids, (e.g. methylbenzoate and dimethyl adipate) and epoxidized oils. Star-shaped polymers are prepared with polyalkenyl coupling agents as disclosed in, for example, U.S. Pat. No. 3,985,830, U.S. Pat. No. 4,391,949 and U.S. Pat. No. 4,444,953; as well as CA 716,645, the disclosure of each of which is incorporated herein by reference. Suitable polyalkenyl coupling agents include divinylbenzene, and preferably m-divinylbenzene. Preferred are tetra-alkoxysilanes such as tetra-methoxysilane (TMOS) and tetra-ethoxysilane (TEOS), tri-alkoxysilanes such as methyltrimethoxysilane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Linear polymers may also be prepared by a post-polymerization "coupling" step. However, unlike radial polymers, "n" in the above formulas is the integer 2, and X is the remnant or residue of a coupling agent.

4. Process to Prepare Hydrogenated Block Copolymers

As noted, in some cases—i.e., (1) when there is a diene in the B interior blocks, (2) when the A block is a polymer of a 1,3-cyclodiene, (3) when there is an impact modifier block D and (4) when the A block is a polymer of a conjugated diene having a vinyl content of less than 35 mol percent—it is necessary to selectively hydrogenate the block copolymer to remove any ethylenic unsaturation prior to sulfonation. Hydrogenation generally improves thermal stability, ultraviolet light stability, oxidative stability, and, therefore, weatherability of the final polymer, and reduces the risk of sulfonating the A block or the D block.

Hydrogenation can be carried out via any of the several hydrogenation or selective hydrogenation processes known in the prior art. Such hydrogenation has been accomplished using methods such as those taught in, for example, U.S. Pat. No. 3,595,942, U.S. Pat. No. 3,634,549, U.S. Pat. No. 3,670,054, U.S. Pat. No. 3,700,633, and U.S. Re. 27,145, the disclosure of each of which is incorporated herein by reference. These methods operate to hydrogenate polymers containing ethylenic unsaturation and are based upon operation of a suitable catalyst. Such a catalyst, or catalyst precursor, preferably comprises a Group 8 to 10 metal such as nickel or cobalt which is combined with a suitable reducing agent such as an aluminum alkyl or hydride of a metal selected from Groups 1, 2 and 13 of the Periodic Table of the Elements, particularly lithium, magnesium or aluminum. This preparation can be accomplished in a suitable solvent or diluent at a temperature from about 20° C. to about 80° C. Other catalysts that are useful include titanium based catalyst systems.

Hydrogenation can be carried out under such conditions that at least about 90 percent of the conjugated diene double bonds are reduced, and between zero and 10 percent of the arene double bonds are reduced. Preferred ranges are at least about 95 percent of the conjugated diene double bonds reduced, and more preferably about 98 percent of the conjugated diene double bonds are reduced.

Once the hydrogenation is complete, it is preferable to oxidize and extract the catalyst by stirring the polymer solution with a relatively large amount of aqueous acid (preferably 1 to 30 percent by weight acid), at a volume ratio of about 0.5 parts aqueous acid to 1 part polymer solution. The nature of the acid is not critical. Suitable acids include phosphoric acid, sulfuric acid and organic acids. This stirring is continued at about 50° C. for from about 30 to about 60 minutes while sparging with a mixture of oxygen and nitrogen. Care must be exercised in this step to avoid that an explosive mixture of oxygen and hydrocarbons is formed.

5. Process to Make Sulfonated Polymers

According to the multiple embodiments disclosed herein, the above prepared block copolymers are sulfonated to obtain a sulfonated polymer product that is in solution and in micellar form. In this micellar form, the sulfonated block copolymer can be neutralized prior to casting a membrane, and at the same time, the risk of gelling and/or precipitation of the sulfonated block copolymer while in solution is reduced.

Without being bound by any particular theory, it is the present belief that the micelle structure of the sulfonated block copolymer can be described as having a core comprising the sulfonated block or blocks having a substantial amount of spent sulfonating agent residues which is surrounded by the sulfonation resistant block or blocks which, in turn, are swollen by an organic non-halogenated aliphatic solvent. As will be further described in more detail below, the sulfonated blocks are highly polar due to the presence of sulfonic acid and/or sulfonate ester functional groups. Accordingly, such sulfonated blocks are sequestered into a core, while the outer sulfonation resistant blocks form a shell which is solvated by a non-halogenated aliphatic solvent. In addition to forming discrete micelles, there may also be formation of polymer aggregates. Without being bound by any particular theory, polymer aggregates can be described as discrete or non-discrete structures resulting from association of polymer chains in ways other than the description provided for micelles, and/or loosely aggregated groups of two or more discrete micelles. Accordingly, the solvated sulfonated block copolymer in micellar form may include discrete micelles and/or aggregates of micelles, with such solution optionally including aggregated polymer chains having structures other than the micelle structure.

Micelles can be formed as a result of the sulfonation process, or alternatively, the block copolymer may arrange in a micelle structure prior to sulfonation.

In some embodiments, for the formation of micelles, the sulfonation processes as described in WO 2008/089332 may be employed. The methods are useful for preparing sulfonated styrenic block copolymers as described in US 2007/021569.

After polymerization, the polymer can be sulfonated using a sulfonation reagent such as an acyl sulfate in at least one non-halogenated aliphatic solvent. In some embodiments, the precursor polymer can be sulfonated after being isolated, washed, and dried from the reaction mixture resulting from the production of the precursor polymer. In some other embodiments, the precursor polymer can be sulfonated without being isolated from the reaction mixture resulting from the production of the precursor polymer.

(i) Solvent

The organic solvent is preferably a non-halogenated aliphatic solvent and contains a first non-halogenated aliphatic solvent which serves to solvate one or more of the sulfonation resistant blocks or non-sulfonated blocks of the copolymer. The first non-halogenated aliphatic solvent may include substituted or unsubstituted cyclic aliphatic hydrocarbons having from about 5 to 10 carbons. Non-limiting examples include cyclohexane, methylcyclohexane, cyclopentane, cycloheptane, cyclooctane and mixtures thereof. The most preferable solvents are cyclohexane, cyclopentane and methylcyclohexane. The first solvent may also be the same solvent used as the polymerization vehicle for anionic polymerization of the polymer blocks.

In some embodiments, the block copolymer may be in micellar form prior to sulfonation even in the case of using only a first solvent. The addition of a second non-halogenated aliphatic solvent to a solution of the precursor polymer in the first non-halogenated aliphatic solvent can result in or assist the "pre-formation" of polymer micelles and/or other polymer aggregates. The second non-halogenated solvent, on the other hand, is preferably chosen such that it is miscible with the first solvent, but is a poor solvent for the sulfonation susceptible block of the precursor polymer in the process temperature range and also does not impede the sulfonation reaction. In other words, preferably, the sulfonation susceptible block of the precursor polymer is substantially insoluble in the second non-halogenated solvent in the process temperature range. In the case where the sulfonation susceptible block of the precursor polymer is polystyrene, suitable solvents which are poor solvents for polystyrene and can be used as the second non-halogenated solvent include linear and branched aliphatic hydrocarbons of up to about 12 carbons, for example, hexane, heptane, octane, 2-ethyl hexane, isooctane, nonane, decane, paraffinic oils, mixed paraffinic solvents, and the like. One preferred example of the second non-halogenated aliphatic solvent is n-heptane.

The pre-formed polymer micelles and/or other polymer aggregates allow the sulfonation of the polymer to proceed essentially without disabling gelling at considerably higher concentration than can be achieved without the addition of the second solvent. In addition, this approach can substantially improve the utility of more polar acyl sulfates, such as $C_3$ acyl sulfate (propionyl sulfate), in terms of polymer sulfonation conversion rate and minimization of by-products. In other words, this approach may improve the utility of more polar sulfonation reagents. Such acyl sulfates are further described below.

(ii) Polymer Concentration

In accordance with some embodiments, high levels of styrene sulfonation can be achieved in a manner that is substantially free of polymer precipitation and free of disabling gelling in the reaction mixture, the reaction product, or both, by maintaining the precursor polymer concentration below a limiting concentration of the precursor polymer, at least during the early stages of sulfonation. It will be understood by those skilled in the art that minor amounts of polymers may deposit on surfaces as a result of localized solvent evaporation in the course of processing in a mixture that is substantially free of polymer precipitation. For example, in accordance with some embodiments, a mixture is considered to be substantially free of polymer precipitation when no more than 5% of the polymer in the mixture has precipitated.

The polymer concentration at which the sulfonation can be conducted depends upon the composition of the starting polymer, since the limiting concentration below which polymer gelling is non-disabling or negligible depends upon the polymer composition. As stated above, the limiting concentration may also be dependent on other factors such as the identity of the solvent or the solvent mixture used and the desired degree of sulfonation. Generally, the polymer concentration falls within the range of from about 1%-wt. to about 30%-wt., alternatively from about 1%-wt. to about 20%-wt., alternatively from about 1%-wt. to about 15%-wt., alternatively from about 1%-wt. to about 12%-wt., or alternatively from about 1%-wt. to about 10%-wt., based on the total weight of a reaction mixture that is preferably substantially free of halogenated solvents. It will be understood by those skilled in the art that suitable ranges include any combination of the specified mol percents even if the specific combination and range is not listed herewith.

In accordance with some embodiments of the presently described technology, the initial concentration of the precursor block polymer or mixture of precursor block polymers should be maintained below the limiting concentration of the precursor polymer(s), alternatively in the range of from about 0.1%-wt. to a concentration that is below the limiting concentration of the precursor polymer(s), alternatively from about 0.5%-wt. to a concentration that is below the limiting concentration of the precursor polymer(s), alternatively from about 1.0%-wt. to a concentration that is about 0.1%-wt. below the limiting concentration of the precursor polymer(s), alternatively from about 2.0%-wt. to a concentration that is about 0.1%-wt. below the limiting concentration of the precursor polymer(s), alternatively from about 3.0%-wt. to a concentration that is about 0.1%-wt. below the limiting concentration of the precursor polymer(s), alternatively from about 5.0%-wt. to a concentration that is about 0.1%-wt. below the limiting concentration of the precursor polymer(s), based on the total weight of the reaction mixture. It will be understood by those skilled in the art that suitable ranges include any combination of the specified mol percents even if the specific combination and range is not listed herewith.

At least in some embodiments, maintaining the polymer concentration below the limiting concentration can result in reaction mixtures with reduced concentrations of by-product carboxylic acid relative to the higher concentration conditions that lead to gelling.

It will be understood by those skilled in the art, however, that during the production of the sulfonated polymer in some embodiments of the present technology, especially in a semi-batch or continuous production process, the total concentration of the polymer(s) in the reaction mixture may be above the limiting concentration of the precursor polymer.

(iii) Sulfonation Agent

According to multiple embodiments, acyl sulfate may be used for sulfonating the polymerized block copolymer. The acyl group preferably is derived from a $C_2$ to $C_8$, alternatively $C_3$ to $C_8$, alternatively $C_3$ to $C_5$, linear, branched, or cyclic carboxylic acid, anhydride, or acid chloride, or mixtures thereof. Preferably, these compounds do not contain non-aromatic carbon-carbon double bonds, hydroxyl groups, or any other functionality that is reactive with acyl sulfate or decomposes readily under sulfonation reaction conditions. For example, acyl groups that have aliphatic quaternary carbons in the alpha-position from the carbonyl functionality (e.g., acyl sulfate derived from trimethylacetic anhydride) appear to decompose readily during polymer sulfonation reaction, and preferably should be avoided in the presently described technology. Also included in the scope of useful acyl groups for the generation of acyl sulfate in the present technology are those derived from aromatic carboxylic acids, anhydrides, and acid chlorides such as benzoic and phthalic anhydride. More preferably, the acyl group is selected from the group of acetyl, propionyl, n-butyryl, and isobutyryl. Even more preferably, the acyl group is isobutyryl. It has been discovered that isobutyryl sulfate can afford high degrees of polymer sulfonation and relatively minimal by-product formation.

The formation of acyl sulfate from a carboxylic anhydride and sulfuric acid can be represented by the following reaction:

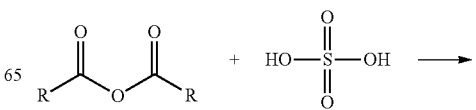

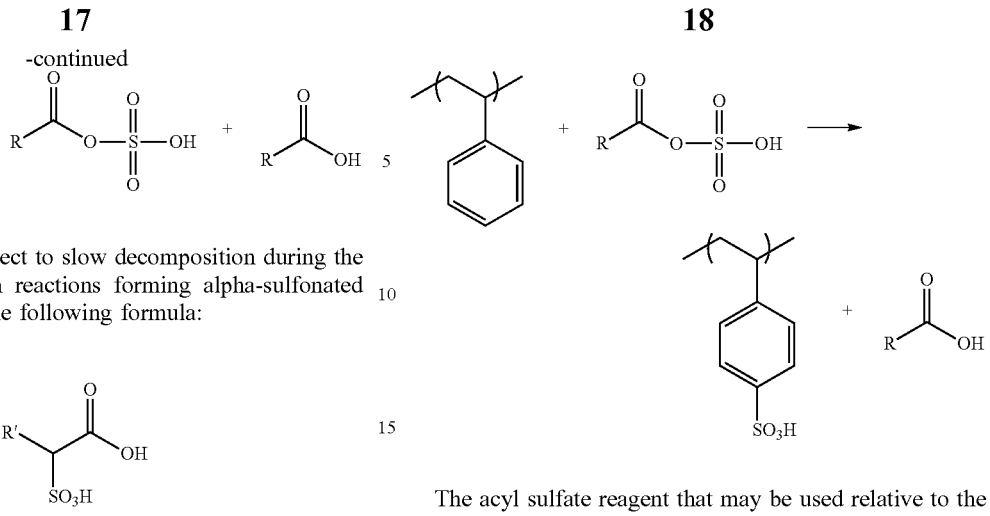

Acyl sulfates are subject to slow decomposition during the course of sulfonation reactions forming alpha-sulfonated carboxylic acids of the following formula:

In one embodiment of the presently described technology, the acyl sulfate reagent is obtained from a carboxylic anhydride and sulfuric acid in a reaction that is conducted in a separate "pre-generation" reaction prior to addition to a solution of polymer in a non-halogenated aliphatic solvent. The pre-generation reaction can be conducted with or without a solvent. When a solvent is used to pre-generate the acyl sulfate, the solvent is preferably non-halogenated. Alternatively, the acyl sulfate reagent can be obtained in an in-situ reaction within a solution of the polymer in a non-halogenated aliphatic solvent. In accordance with this embodiment of the present technology, the molar ratio of anhydride to sulfuric acid can be from about 0.8 to about 2, and preferably from about 1.0 to about 1.4. The sulfuric acid used in this preferred method preferably has a concentration of about 93% to about 100% and more preferably has a concentration of about 95% to about 100%, by weight. It will be understood by those skilled in the art that oleum may be used as an alternative to sulfuric acid in an in-situ reaction to generate acyl sulfate, provided that the oleum strength is sufficiently low so as to avoid or minimize unintended charring of the reaction mixture.

In another embodiment of the present technology, the acyl sulfate reagent can be obtained from a carboxylic anhydride and oleum in a reaction that is conducted in a separate "pre-generation" reaction prior to addition to a solution of polymer in aliphatic solvent, wherein the oleum strength is in the range of from about 1% to about 60% free sulfur trioxide, alternatively from about 1% to about 46% free sulfur trioxide, alternatively from about 10% to about 46% free sulfur trioxide, and wherein the molar ratio of anhydride to sulfuric acid present in the oleum is from about 0.9 to about 1.2.

Additionally, the acyl sulfate reagent can be prepared from a carboxylic anhydride via reaction with any combination of sulfuric acid, oleum, or sulfur trioxide. Further, the acyl sulfate reagent can be prepared from a carboxylic acid via reaction with chlorosulfonic acid, oleum, sulfur trioxide, or any combination thereof. Moreover, the acyl sulfate reagent can also be prepared from a carboxylic acid chloride via reaction with sulfuric acid. Alternatively, the acyl sulfate may be prepared from any combination of carboxylic acid, anhydride, and/or acid chloride.

The sulfonation of polymer styrenic repeat units with the acyl sulfate can be represented by the following reaction:

The acyl sulfate reagent that may be used relative to the moles of sulfonation susceptible monomer repeat units present in the polymer solution in amounts ranging from very low levels for lightly sulfonated polymer products to high levels for heavily sulfonated polymer products. The molar amount of the acyl sulfate can be defined as the theoretical amount of the acyl sulfate that can be generated from a given method, the amount being dictated by the limiting reagent in the reaction. The molar ratio of acyl sulfate to styrene repeat units (i.e., sulfonation susceptible units) in accordance with some embodiments of the present technology may range from about 0.1 to about 2.0, alternatively from about 0.2 to about 1.3, alternatively from about 0.3 to about 1.0.

In accordance with at least some embodiments of the presently described technology, the degree of sulfonation of the vinyl aromatic monomers susceptible to sulfonation in the block polymers is greater than about 0.4 milliequivalents (meq) sulfonic acid per gram sulfonated polymer (0.4 meq/g), alternatively greater than about 0.6 meq sulfonic acid per gram sulfonated polymer (0.6 meq/g), alternatively greater than about 0.8 meq sulfonic acid per gram sulfonated polymer (0.8 meq/g), alternatively greater than about 1.0 meq sulfonic acid per gram sulfonated polymer (1.0 meq/g), alternatively greater than about 1.4 meq sulfonic acid per gram sulfonated polymer (1.4 meq/g). For example, after the precursor polymers described above are sulfonated in accordance with the methods of the presently described technology, the typical levels of sulfonation are where each B block contains one or more sulfonic functional groups. Preferred levels of sulfonation are from about 10 to about 100 mol percent, alternatively from about 20 to 95 mol percent, alternatively from about 30 to 90 mol percent, and alternatively from about 40 to about 70 mol percent, based on the mol percent of sulfonation susceptible vinyl aromatic monomers in each B block, which can be, for example, unsubstituted styrene monomer, ortho-substituted styrene monomer, meta-substituted styrene monomer, alpha-methylstyrene monomer, 1,1-diphenyl ethylene monomer, 1,2-diphenyl ethylene monomer, a derivative thereof, or a mixture thereof. It will be understood by those skilled in the art that suitable ranges of sulfonation level include any combination of the specified mol percents even if the specific combination and range is not listed herewith.

The level or degree of sulfonation of a sulfonated polymer can be measured by NMR and/or titration methods as known to people skilled in the art, and/or a method using two separate titrations as described in the Examples below and may be appreciated by people skilled in the art. For example, a resulting solution from the methods of the present technology can be analyzed by $^1$H-NMR at about 60° C. (±20°

C.). The percentage styrene sulfonation can be calculated from the integration of aromatic signals in the $^1$H-NMR spectrum. For another example, the reaction product can be analyzed by two separate titrations (the "two-titration method") to determine the levels of styrenic polymer sulfonic acid, sulfuric acid, and non-polymeric by-product sulfonic acid (e.g. 2-sulfo-alkylcarboxylic acid), and then to calculate the degree of styrene sulfonation based on mass balance. Alternatively, the level of sulfonation can be determined by titration of a dry polymer sample, which has been re-dissolved in tetrahydrofuran with a standardized solution of NaOH in a mixture of alcohol and water. In the latter case, rigorous removal of by-product acids are preferably ensured.

Although embodiments for sulfonating polymers are described above in the context of acyl sulfate reagents, the utility of other sulfonation reagents are also contemplated. For example, the use of those sulfonation reagents derived from complexing/reacting sulfur trioxides and phosphate esters such as triethylphosphate has been demonstrated in the present technology. The chemistry of such sulfonation reagents is known in the art to afford aromatic sulfonation with significant degrees of sulfonic acid alkyl ester incorporation. As such, the resultant sulfonated polymers likely contain both sulfonic acid and sulfonic acid alkyl ester groups. Other contemplated sulfonation reagents include, but are not limited to, those derived from the reaction or complexation of sulfur trioxide with phosphous pentoxide, polyphosphoric acid, 1,4-dioxane, triethylamine, etc.

(iv) Reaction Conditions

The sulfonation reaction between the acyl sulfates and sulfonation susceptible block copolymers such as aromatic-containing polymers (e.g., styrenic block copolymers) can be conducted at a reaction temperature in the range of from about 20° C. to about 150° C., alternatively from about 20° C. to about 100° C., alternatively from about 20° C. to about 80° C., alternatively from about 30° C. to about 70° C., alternatively from about 40° C. to about 60° C. (e.g., at about 50° C.). The reaction time can be in the range of from approximately less than 1 minute to approximately 24 hours or longer, dependent on the temperature of the reaction. In some preferred acyl sulfate embodiments that utilize in-situ reaction of carboxylic anhydride and sulfuric acid, the initial temperature of the reaction mixture can be about the same as the intended sulfonation reaction temperature. Alternatively, the initial temperature may be lower than the intended subsequent sulfonation reaction temperature. In a preferred embodiment, the acyl sulfate can be generated in-situ at about 20° C. to about 40° C. (e.g., at about 30° C.) for about 0.5 to about 2 hours, alternatively about 1 to about 1.5 hours, and then the reaction mixture can be heated to about 40° C. to about 60° C. to expedite the completion of the reaction.

Although not required, an optional reaction quenching step can be conducted through the addition of a quenching agent, which can be, for example, water or hydroxyl-containing compounds such as methanol, ethanol, or isopropanol. Typically in such a step, an amount of the quenching agent at least sufficient to react with residual unreacted acyl sulfate may be added.

In some embodiments of the presently described technology, the sulfonation of the aromatic-containing polymer in a non-halogenated aliphatic solvent can be carried out by contacting the aromatic-containing polymer with a sulfonation reagent in a batch reaction or a semi-batch reaction. In some other embodiments of the present technology, the sulfonation can be carried out in a continuous reaction, which can be enabled, for example, through the use of a continuous stirred tank reactor or a series of two or more continuous stirred tank reactors.

As a result of sulfonation, the micelle cores contain sulfonation susceptible blocks having sulfonic acid and/or sulfonate ester functionality which are surrounded by an outer shell containing sulfonation resistant blocks of the block copolymer. The driving force for this phase segregation (causing the micelle formation) in solution has been attributed to the considerable difference in polarity between the sulfonated block(s) and the non-sulfonated blocks of the sulfonated block copolymer. The latter blocks are freely solvable by a non-halogenated aliphatic solvent, for example the first solvent disclosed above. On the other hand, the sulfonated polymer block(s) may arrange to concentrate in the core of micelle.

Once the sulfonation reaction is completed, the block copolymers can be cast directly into an article form (e.g., membrane) without the necessity of isolating the block copolymer. In this particular embodiment the polymeric film (e.g., membrane) can be submerged in water and will retain its form (solid) while in the water. In other words, the block copolymer will not dissolve in water or disperse in water.

(v) Additional Components

Further, the copolymers disclosed herein can be compounded with other components not adversely affecting the copolymer properties or the membrane formed from the sulfonated block copolymer. Further, the disclosed block copolymers may be blended with a large variety of other polymers, including olefin polymers, styrene polymers, tackifying resins, hydrophilic polymers and engineering thermoplastic resins, with polymer liquids such ionic liquids, natural oils, fragrances, and with fillers such as nanoclays, carbon nanotubes, fullerenes, and traditional fillers such as talcs, silica and the like.

In addition, the sulfonated polymers of the present invention may be blended with conventional styrene/diene and hydrogenated styrene/diene block copolymers, such as the styrene block copolymers available from Kraton Polymers LLC. These styrene block copolymers include linear hydrogenated and non-hydrogenated S-B-S, S-I-S, S-EB-S, S-EP-S block copolymers. Also included are radial block copolymers based on styrene along with isoprene and/or butadiene and selectively hydrogenated radial block copolymers.

Additionally, the styrene block copolymers S-B-S, S-I-S, S-EB-S, S-EP-S may be functionalized, for example with a monocarboxylic or polycarboxylic acid compound, such as maleic acid or a derivative such as maleic anhydride. The preferred acid compounds are unsaturated monocarboxylic and polycarboxylic-containing acids ($C_3$-$C_{10}$) with preferably at least one olefinic unsaturation, and anhydrides, salts, esters, ethers and other substituted derivatives from such acids. Examples of such materials include maleic acid, fumaric acid, itaconic acid, citraconic acid, acrylic acid, acrylic polyethers, acrylic anhydride, methacrylic acid, crotonic acid, isocrotonic acid, mesaconic acid, angelic acid, maleic anhydride, itaconic anhydride and citraconic anhydride. The preferred monomers for functionalizing styrenic block copolymers are maleic anhydride, maleic acid, fumaric acid and their derivatives. These functionalized styrenic block copolymers (F-SBC) may be blended with the sulfonated block copolymer (S-SBC) in a ratio (F-SBC/S-SBC) of 20/80 to 80/20, more preferably from 30/70 to 70/30 or most preferably 60/40 to 40/60. Additionally, other acid functionalities may be used as well as known as the art.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like). Still other polymers included hereunder are polyvinyl chloride (PVC) and blends of PVC with other materials.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, sulfonated polystyrene and styrene/olefin copolymers. Representative styrene/olefin copolymers are substantially random ethylene/styrene copolymers, preferably containing at least 20, more preferably equal to or greater than 25 weight percent copolymerized styrene monomer.

Exemplary materials that could be used as additional components would include, without limitation:
1) pigments, antioxidants, stabilizers, surfactants, and flow promoters;
2) particulates, fillers and oils; and
3) solvents and other materials added to enhance processability and handling of the composition.

With regard to the pigments, antioxidants, stabilizers, surfactants, and flow promoters, these components, when utilized in compositions with the sulfonated block copolymers of the present invention may be included in amounts up to and including 10%, i.e., from 0 to 10%, based on the total weight of the composition. When any one or more of these components are present, they may be present in an amount from about 0.001 to about 5%, and even more preferably from about 0.001 to about 1%.

With regard to particulates, fillers and oils, such components may be present in an amount up to and including 50%, from 0 to 50%, based on the total weight of the composition. When any one or more of these components are present, they may be present in an amount from about 5 to about 50%, preferably from about 7 to about 50%.

c. Lamination

As discussed above, the sulfonated block copolymer as disclosed herein is formed into a film for laminating onto the porous substrate. It was surprisingly found that laminating the block copolymer onto the substrate produced significantly improved MVTR compared to direct solution coating; the MVTR of the laminates was nearly equivalent to that of the pure polymer film of equal thickness. As MVTR is correlated to sensible heat transfer, improved MVTR is indicative of improved ERV unit efficiency. Accordingly ERV core units employing such membranes will show improved efficiency and effectiveness.

Lamination may be conducted as known in the art. Generally, the sulfonated block copolymer will be formed into a film, optionally with other components, (hereinafter "polymeric film") and joined with the porous substrate to form the laminate membrane. Multiple methods may be employed for lamination of the polymeric film for attachment or bonding of the polymeric film to the porous substrate. For example, lamination can be conducted by cold lamination or heat (thermal) lamination. Additionally, sonic bonding may be employed for lamination.

Heat lamination is carried out by contacting the polymeric film with the porous substrate under temperature and pressure thereby forming a bond between the two. The lamination can take place in a vessel such as an oven or other machine or apparatus which enables pressing of the polymeric film and porous substrate together. Generally the temperature ranges from 95° to 450° F., and the pressure can have a range from 100 to 7,000 psi. Residence time, or time subjected to the increased temperature and pressure can be from 30 seconds to 10 minutes. Thereafter, the membrane can be cooled at room temperature and pressure to produce the finalized membrane. Various types of laminating assemblies known in the art can be employed to contact the polymeric film and substrate under heat and pressure. Adhesives may also be used in heat lamination processes. Further, heat activated adhesives may be employed.

One type of heat lamination utilizes a press. A press can have two flat metal platens that are each individually heated and contain thermometers for temperature validation. In addition, the two heated metal platens can be drawn together under adjustable pressure. A film of the sulfonated block copolymer disclosed herein can be placed on a substrate to be placed between the metal platens thus forming a two ply membrane. Two pieces of metal foil can be placed around this two ply arrangement and then put into the press under pressure. The typical operating conditions may include temperatures from 150-450° F., pressure from 100-7000 psi and residence time of approximately one to two minutes. Temperature, pressure and time may be varied to achieve desired laminate bonding.

Figure 7:
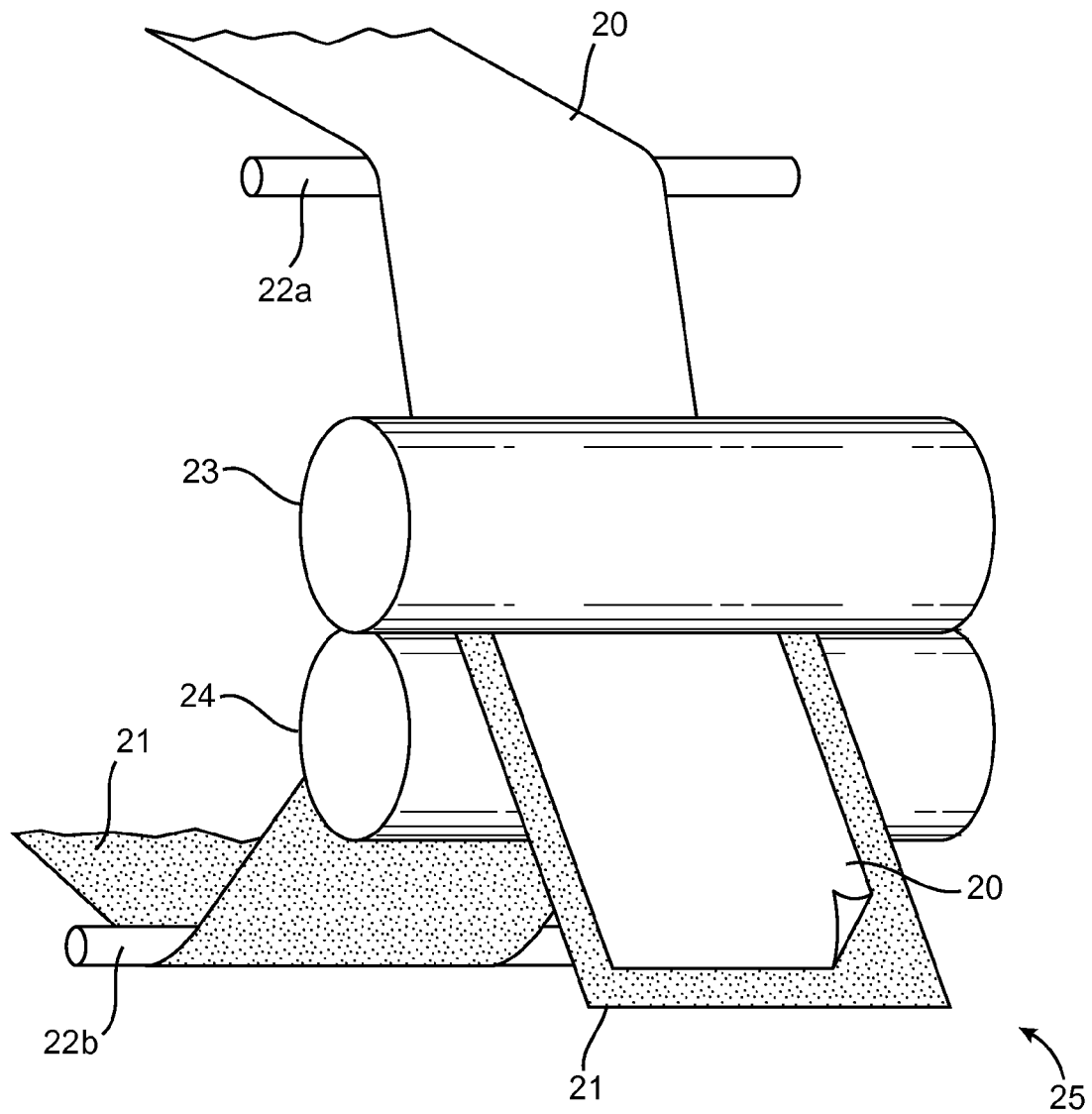
FIG. 7 illustrates a roller assembly.

Besides laminating by means of a press, roller assembles may also be used. Such a roller assembly is shown in FIG. 7. As indicated a sulfonated polymer film 20 is fed past sub-rollers 22a and between top roller 23 and bottom roller 24. A substrate 21 is also fed past sub-rollers 22b and between top roller 23 and bottom roller 24. The polymer film 20 and substrate 21 are pinched between the top roller 23 and bottom roller 24 thus bonding the polymer film 20 to the substrate 21 and forming laminate membrane 25. Either the top roller 23, bottom roller 24, or both rollers, may be heated sufficient for bonding the polymer film to the substrate. Additionally, the rollers 23 and 24 can be separated or pushed together to adjust the pressure at which the lamination occurs. Temperatures may be from 150-450° F., pressures from 100-7000 psi. Furthermore, as the substrate and polymer films are fed into the rollers, this allows for large quantities of laminated substrate to produced. Line speed may vary depending on temperature and pressure and the desired quality and quantity of the laminate membrane. Accordingly, commercial processes make use of such roller assemblies for preparing large quantities of laminate product.

An additional method of lamination is termed solvent bonding. This can be done under heat or room temperature. In this type of lamination, an organic solvent is applied to the sulfonated block copolymer film. The portion of the sulfonated polymer film contacted with the solvent accordingly softens. The film is then pressed onto the substrate thereby forming a bond between the portions softened by the organic solvent and the substrate. Organic solvents may be used which have the effect of solvating portions of the polymeric film. Such organic solvents include alcohols, alkyls, ketones, acetates, ethers, and aromatic solvents, such as toluene, and benzene.

Another method for lamination is cold lamination, which generally utilizes wet or dry adhesives. While labeled cold, such temperature includes room temperatures. Adhesive lamination is carried out by applying adhesive to one side of the polymeric film and then contacting it with a porous substrate. However, the adhesive should be applied to cover a particular surface area of the substrate and polymeric film so as to minimize blockages which may prevent vapor from passing through. Adhesives may have the effect of blocking certain pores of the substrate, thereby reducing efficiency. Accordingly, with adhesive lamination, it is preferable to minimize the area covered by the adhesive. The adhesive employed can be for example urethane or latex based.

In either cold or heated lamination, laboratory or commercial scale lamination assemblies may also be used for contacting and bonding the polymeric film and substrate to form a laminate. There are many possible configurations for commercial scale lamination, including rollers, presses, the most prevalent in the art being the use of dual, heated pinch rollers.

When contacting the polymeric film with the porous substrate, measures can be taken to ensure that the film will be flat against the porous substrate. For example a lamination apparatus with rollers can be applied across the surfaces to flatten and remove bubbles.

After lamination samples can be analyzed using Scanning Electron Microscopy (SEM) to view the quality of the lamination.

Illustrative Embodiments

The following examples are intended to be illustrative only, and are not intended to be, nor should they be construed as, limiting the scope of the present invention in any way.

a. Materials and Methods

Degree of Sulfonation:

The degree of sulfonation as described herein and as determined by titration was measured by the following potentiometric titration procedure. The sulfonation reaction product solution was analyzed by two separate titrations (the "two-titration method") to determine the levels of styrenic polymer sulfonic acid, sulfuric acid, and non-polymeric by-product sulfonic acid (2-sulfoisobutyric acid). For each titration, an aliquot of about five (5) grams of the reaction product solution was dissolved in about 100 mL of tetrahydrofuran and about 2 mL of water and about 2 mL of methanol were added. In the first titration, the solution was titrated potentiometrically with 0.1 N cyclohexylamine in methanol to afford two endpoints; the first endpoint corresponded to all sulfonic acid groups in the sample plus the first acidic proton of sulfuric acid, and the second endpoint corresponded to the second acidic proton of sulfuric acid. In the second titration, the solution was titrated potentiometrically with 0.14 N sodium hydroxide in about 3.5:1 methanol:water to afford three endpoints: The first endpoint corresponded to all sulfonic acid groups in the sample plus the first and second acidic proton of sulfuric acid; the second endpoint corresponded to the carboxylic acid of 2-sulfoisobutyric acid; and the third endpoint corresponded to isobutyric acid.

The selective detection the of the second acidic proton of sulfuric acid in the first titration, together with the selective detection of the carboxylic acid of 2-sulfoisobutyric acid in the second titration, allowed for the calculation of acid component concentrations.

The degree of sulfonation as described herein and as determined by 1H-NMR was measured using the following procedure. About two (2) grams of non-neutralized sulfonated polymer product solution was treated with several drops of methanol and the solvent was stripped off by drying in a 50° C. vacuum oven for approximately 0.5 hours. A 30 mg sample of the dried polymer was dissolved in about 0.75 mL of tetrahydrofuran-$d_8$ (THF-$d_8$), to which was then added with a partial drop of concentrated $H_2SO_4$ to shift interfering labile proton signals downfield away from aromatic proton signals in subsequent NMR analysis. The resulting solution was analyzed by $^1$H-NMR at about 60° C. The percentage styrene sulfonation was calculated from the integration of $^1$H-NMR signal at about 7.6 part per million (ppm), which corresponded to one-half of the aromatic protons on sulfonated styrene units; the signals corresponding to the other half of such aromatic protons were overlapped with the signals corresponding to non-sulfonated styrene aromatic protons and tert-butyl styrene aromatic protons.

The ion exchange capacity as described herein was determined by the potentiometric titration method described above and was reported as milliequivalents of sulfonic acid functionality per gram of sulfonated block copolymer.

MVTR:

A number of test methods are known for the determination of water vapor transmission (MVTR) through materials. In the examples disclosed herein, a modified ASTM Method E96-80-B is employed, which is also referred to as "the upright water cup method."

This method includes placing a sample of the membrane tightly onto the mouth of a test cup that is partially filled with water. Air of known relative humidity and temperature (the test is isothermal) is moved across the cup, thereby coming in contact with the membrane on the mouth of the cup. As air passes over the membrane, moisture vapor is drawn through the membrane sample.

MVTR was measured using membrane samples that were cut using a die of 13/16 inch diameter. These circular samples were then mounted inside glass vials using a rubber gasket to ensure a good, leak-free seal. The samples vials were filled with deionized water to the point of leaving an approximate 0.25 inch gap (headspace) between the water level and the inner membrane surface. Temperature and Relative Humidity was controlled by using a Tenney Environmental Chamber. The Chamber additional had 10 volt internal computer fans to facilitate air flow.

Water-filled sample vials were initially weighed on an analytical balance accurate to 0.1 mg. Over an eight hour period, the samples were weighed on two hour intervals and the MVTR was calculated as an average in the units of g/m$^2$×day. Typical standard deviations ranged from about 20 to 100 g/m$^2$×day. The rate calculations were done by a least squares line fit method revealing R values greater than 0.98.

As will be understood in complex measurements, there may be some small fluctuations of the absolute magnitude of the MVTR measured in this manner. Accordingly, in order to account for this the data in Table 1 is also presented as a percentage compared to a control. In this case the control is a uniform neat 0.5 mil thickness film of SBC-1. As a standard operation procedure, a control was run with each set of measurements.

b. Experiments

Preparation of Sulfonated Block Copolymer SBC-1

A pentablock copolymer having the configuration A-D-B-D-A was prepared by sequential anionic polymerization where the A blocks are polymer blocks of para-tert-butylstyrene (ptBS), the D blocks were comprised of polymer blocks of hydrogenated isoprene (Ip), and the B blocks were comprised of polymer blocks of unsubstituted styrene (S). Anionic polymerization of the t-butylstyrene in cyclohexane was initiated using sec-butyllithium affording an A block having a molecular weight of 15,000 g/mol. Isoprene monomers were then added to afford a second block with a molecular weight of 9,000 g/mol (ptBS-Ip-Li). Subsequently, styrene monomer was added to the living (ptBS-Ip-Li) diblock copolymer solution and was polymerized to obtain a living triblock copolymer (ptBS-Ip-S-Li). The polymer styrene block was comprised only of polystyrene having a molecular weight of 28,000 g/mol. To this solution was added another aliquot of isoprene monomer resulting in an isoprene block having a molecular weight of 11,000 g/mol. Accordingly, this afforded a living tetrablock copolymer structure (ptBS-Ip-S-Ip-Li). A second aliquot of para-tert butyl styrene monomer was added, and polymerization thereof was terminated by adding methanol to obtain a ptBS block having a molecular weight of about 14,000 g/mol. The ptBS-Ip-S-Ip-ptBS was then hydrogenated using a standard $Co^{2+}$/triethylaluminum method to remove the C=C unsaturation in the isoprene portion of the pentablock. The block polymer was then sulfonated directly (without further treatment, not oxidizing, washing, nor "finishing") using an i-butyric anhydride/sulfuric acid reagent. The hydrogenated block copolymer solution was diluted to about 10% solids by the addition of heptane (roughly an equal volume of heptane per volume of block copolymer solution). Sufficient i-butyric anhydride and sulfuric acid (1/1 (mol/mol)) were added to afford 2.0 meq of sulfonated polystyrene functionality per g of block copolymer. The sulfonation reaction was terminated by the addition of ethanol (2 mol ethanol/mol of i-butyric anhydride) The resulting polymer was found, by potentiometric titration, to have an "Ion Exchange Capacity (IEC)" of 2.0 meq of —$SO_3H$/g of polymer. The solution of sulfonated polymer had a solids level of about 10% wt/wt in a mixture of heptane, cyclohexane, and ethyl i-butyrate.

Preparation of Laminate Membranes

After preparation of films formed from SBC-1, the films were then laminated to a substrate. Heat Lamination, designated as "heat bonding" in the examples below, was accomplished by using a press. The press has two flat metal platens that are each individually heated and contain thermometers for temperature validation. In addition, the two heated metal platens can be drawn together under adjustable pressure. Thus, in all the heat-laminated examples, a 5 inch×5 inch square of 0.5 mil thick polymer film was layered on to a 4 inch by 4 inch square of substrate. Two pieces of metal foil were put outside this two ply arrangement. This entire sandwich was then put into a press and placed under pressure. The operating conditions included a temperatures within the 320-350° F. range, pressure in the 1000-5000 pound pressure range and heating time of approximately one to two minutes.

Since the polymeric film sample was slightly larger than the 4"×4" square of substrate, after lamination the unbonded edge was used for a manual peel test to determine the bond strength. In all the reported examples, the excess unbonded membrane would tear first, leaving the bond to the substrate intact. Samples were also observed using Scanning Electron Microscopy (SEM) to view the quality of the lamination. In all the reported cases, the laminates were essentially defect-free and the polymeric film had the appearance of flow (ingress) within the fabric of the substrates.

For examples designated as "solvent bonding" the polymer film was applied by means of an organic solvent. In this case an organic solvent was applied to the polymer film. This has the effect of causing a portion of the film which was contacted with the solvent to soften. The film is then pressed to the substrate. With such pressure, the portions softened by the organic solvent facilitate the bonding of the film to the substrate.

Preparation of Comparative Solvent Cast Membranes

Generally, coating involves application of the polymer to the substrate in solution or liquid form. In the examples herein designated as "Solution coating", the following procedure was used. The mass and dimension of the substrate was first determined in order to calculate a coat weight (expressed as grams per square meter—gsm). Next, this substrate was placed onto a glass plate and a 3 wt % solution of the sulfonated block copolymer (2.01EC) was poured on top of the substrate followed by the removal of excess solution with a glass rod. The solvent cast membrane was allowed to dry completely then the added mass of the polymer was determined to complete the coat weight calculation. Although not used in these examples, solution coating of the sulfonated block copolymer solutions could be introduced by simple dip coating or spray coating.

4.0 Samples for Comparative Data

TABLE 1

Comparative MVTR

| Experiment No. | Substrate | Polymer | Membrane formation | Membrane MVTR | Control MVTR | % of Control* |
|---|---|---|---|---|---|---|
| Comp 1 | PET Scrim | SBC-1 | Solution Coated | 320 | 2200 | 15 |
| Comp 2 | PET Scrim | SBC-1 | Solution Coated | 334 | 2200 | 15 |
| Exp 1 | PET Scrim | SBC-1 | Laminated (solvent bonding) | 2270 | 2600 | 87 |
| Exp 2 | PET Scrim | SBC-1 | Laminated (heat bonding) | 2400 | 2600 | 92 |
| Exp 3 | PET Scrim laminated on a commercially lamination line | SBC-1 | Laminated (heat bonding) | 2400 | 2600 | 96 |

TABLE 1-continued

| | | | Comparative MVTR | | | |
|---|---|---|---|---|---|---|
| Exp 4 | Carbon Fiber Veil | SBC-1 | Laminated (heat bonding) | 2500 | 2600 | 96 |
| Exp 5 | Fiber Glass Scrim | SBC-1 | Laminated (heat bonding) | 2500 | 2600 | 96 |
| Exp 6 | Nylon Veil | SBC-1 | Laminated (heat bonding) | 2500 | 2600 | 95 |

| | Comparative commercially available membranes | | | |
|---|---|---|---|---|
| Experiment No. | Membrane | Membrane MVTR | Control MVTR | % of Control* |
| Comp 3 | Innergytech Coated cellulosic Paper | 1780 | 2030 | 88 |
| Comp 4 | Mitsubishi Lossnay cellulosic Paper | 1640 | 2230 | 74 |

MVTR measurement at 25° C. and 50% Relative Humidity

Table 1 compares the use of coated membranes to laminated membranes with respect to MVTR. Membranes with higher MVTR when used in ERV core units will promote more effective latent heat transfer and thus great ERV effectiveness and efficiency.

In particular Comp 1 and Comp 2 demonstrate MVTR with respect to copolymer SBC-1 solution coated onto a substrate, in this case PET scrim. Exps 1-6 demonstrate MVTR with respect to copolymer SBC-1 laminated onto various substrates including PET Scrim, Carbon Fiber Veil, Fiber Glass Scrim and Nylong Veil. The heated laminate was virtually colorless in all cases except the carbon fiber veil which is naturally black in color.

Furthermore, Exps 1-6 laminated membranes surprisingly and unexpectedly produced significantly improved MVTR as compared Comp 1 and 2 coated membranes. This can further be seen in that both Comp 1 and 2 employ a PET Scrim, and Exp 1 and 2 also utilize PET scrim. Thus all conditions are the same—the same substrate and the same SBC-1 polymer is used, except however, Comp 1 and 2 are solution coated whereas Exp 1 and 2 are laminated. Thus it can be seen that SBC-1 laminated onto substrate produces exceptional MVTR for use in ERV units.

Moreover Table 1 also shows comparative results for membranes from several well known commercially available ERV units, namely experiment numbers Comp 3 and 4. These results demonstrate a substantial advantage of the laminated SBC-1 membranes as compared to the comparative commercial membranes. In particular, Exps 3-6 demonstrate a MVTR of above 96%. Generally MVTR's above 90% are advantageous as compared to conventional membranes, and MVTR's above 95% are exceptional.

Accordingly, Table 1 demonstrates the unexpected and significant advantages obtained by the membranes according to the disclosure herein using SBC-1 laminates. As MVTR performance correlates to latent heat transfer efficiency, such membranes would provide significantly improved and exceptional MVTR for use in ERV units.

TABLE 2

| | | Commercial Roller lamination MVTR measurement | | | |
|---|---|---|---|---|---|
| Expt no. | Substrate | Polymer | Membrane Formation | Membrane MVTR | Control MVTR | % of Control |
| Exp 7 | Apex RCO8 Nylon Woven Veil | SBC-1 | Laminated (heat bonding)[1] | 2310 | 2250 | 103 |
| Exp 8 | Apex XA91A PET Woven Veil | SBC-1 | Laminated (heat bonding)[1] | 2370 | 2250 | 105 |
| Exp 9 | 0.8 Non-woven PET Scrim | SBC-1 | Thermal lamination on commercial line[1] | 2300 | 2250 | 102 |
| Exp 10 | Trilaminate (Non-woven PET 0.8 oz outer layers and MD9200 film inner layer) | SBC-1 | Thermal lamination on commercial line[1] | 2200 | 2700 | 81 |

MVTR measurement at 25° C. and 50% Relative Humidity
[1]Conditions for heat bonding lamination using a commercial thermal calendaring lamination line: 260° C., 450 psi, 8 yards per minute line speed Table 2 illustrates membranes laminated on commercial roller lamination lines and the respective MVTR results. The "control" in Table 2 is a 0.5 mil film of SBC-1 which shows very good MVTR values. As illustrated in Table 2, by comparing the experimental results of the control to the laminated membranes, it can be seen that the MVTR values are not significantly affected with the bonding of a substrate. Accordingly, with SBC-1 laminated to a substrate, MVTR values can be reached which are close to those of the SBC-1 polymer alone.

Exp. 7-9 illustrates thermal lamination (commercial line provided by 3M Powell Company) MVTR values are obtained which are equal to or slightly better than the control. The values higher than the controls may be due to the compression (thinning) of the SBC-1 polymer layer during the process that runs the laminate under pressure and temperature between calendar rolls.

Exp. 10 illustrates the production of a trilaminate consisting of non-woven PET scrim for outer layers and a 0.5 mil SBC-1 film in the center. The extra thickness of the additional PET layer creates greater resistance to moisture vapor transport hence the lower MVTR performance.

What is claimed is:

1. A laminate membrane for a core in an energy recovery system for the exchange of heat and moisture between air streams passing through said system, said membrane comprising:
   a fibrous microporous support substrate,
   a film comprising a sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units,
   wherein the film is laminated on the microporous support substrate whereby said film is bonded to the microporous support.

2. The membrane of claim 1, further comprising a spacer element interposed between said membrane and a second membrane, said spacer and said membrane forming a layer in said core.

3. The membrane of claim 2, wherein said core has a plurality of said layers stacked one upon the other.

4. The membrane of claim 1, wherein the microporous substrate is a fibrous woven or non-woven material.

5. The membrane of claim 4, wherein the microporous substrate is selected from the group consisting of carbon, fiberglass, polyester, polyethylene, polyethylene terephthalate, cellulose, cellulose nitrate, cellulose acetate, nylon, polytetrafluoroethylene.

6. The membrane of claim 1, wherein said sulfonated block copolymer is heat laminated, solvent laminated or adhesive laminated onto the microporous support substrate.

7. The membrane of claim 1, wherein said film comprises a blend of said sulfonated block copolymer with hydrogenated or non-hydrogenated thermoplastic elastomeric styrenic block copolymers, or mixtures thereof.

8. The membrane of claim 1 wherein each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof.

9. The membrane of claim 1 wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

10. The membrane of claim 1, wherein the sulfonated block copolymer has the general configuration A-B-A, A-B-A-B-A, $(A-B-A)_nX$, $(A-B)_nX$, A-D-B-D-A, A-B-D-B-A, $(A-D-B)_nX$, $(A-B-D)_nX$ or mixtures thereof, where n is an integer from 2 to about 30, and X is a coupling agent residue and wherein each D block is a polymer block resistant to sulfonation and the plurality of A blocks, B blocks, or D blocks are the same or different.

11. The membrane of claim 10 wherein each D block is selected from the group consisting of (i) a polymerized or copolymerized conjugated diene selected from isoprene, 1,3-butadiene having a vinyl content prior to hydrogenation of between 20 and 80 mol percent, (ii) a polymerized acrylate monomer, (iii) a silicon polymer, (iv) polymerized isobutylene and (v) mixtures thereof, wherein any segments containing polymerized 1,3-butadiene or isoprene are subsequently hydrogenated.

12. An energy recovery system having a core unit permitting heat and moisture exchange between at least two air streams, said core unit comprising:
   a plurality of spacer elements arranged in a stacked configuration, said spacer elements forming air passageways configured for the flow of at least two independent air streams therethrough,
   a plurality of laminated membranes with said spacer interposed therebetween, said membranes being comprised of a microporous fibrous substrate support and a film comprising a sulfonated block copolymer laminated to the microporous substrate support whereby said film is bonded to the microporous support,
   said sulfonated block copolymer having at least one end block A and at least one interior block B wherein each A block contains essentially no sulfonic acid or sulfonate ester functional groups and each B block is a polymer block containing from about 10 to about 100 mol percent sulfonic acid or sulfonate ester functional groups based on the number of monomer units of the B block.

13. The system of claim 12, wherein said passageways are comprised of two sets of passageways with a first set arranged in a first direction and a second set arranged in a second direction different from said first direction thereby enabling said at least two independent air streams to have a cross-flow pattern.

14. The system of claim 12, wherein the spacer element is metal, fiberglass or plastic.

15. The system of claim 12, wherein the microporous substrate support is a fibrous woven or non-woven material.

16. The system of claim 12, wherein the microporous substrate support is selected from the group consisting of carbon, fiberglass, polyester, polyethylene, polyethylene terephthalate, cellulose, cellulose nitrate, cellulose acetate, nylon, polytetrafluoroethylene.

17. The system of claim 12, wherein said sulfonated block copolymer is heat laminated, solvent laminated or adhesive laminated on the microporous substrate support.

18. The system of claim 12, wherein said film comprises a blend of said sulfonated block copolymer with hydrogenated or non-hydrogenated thermoplastic elastomeric styrenic block copolymers, and mixtures thereof.

19. The system of claim 12 wherein each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof.

20. The system of claim 12 wherein each B block comprises segments of one or more vinyl aromatic monomers selected from polymerized (i) unsubstituted styrene monomers, (ii) ortho-substituted styrene monomers, (iii) meta-substituted styrene monomers, (iv) alpha-methylstyrene, (v) 1,1-diphenylethylene, (vi) 1,2-diphenylethylene and (vii) mixtures thereof.

21. The system of claim 12, wherein the sulfonated block copolymer has the general configuration A-B-A, A-B-A-B-

A, (A-B-A)$_n$X, (A-B)$_n$X, A-D-B-D-A, A-B-D-B-A, (A-D-B)$_n$X, (A-B-D)$_n$X or mixtures thereof, where n is an integer from 2 to about 30, and X is a coupling agent residue and wherein each D block is a polymer block resistant to sulfonation and the plurality of A blocks, B blocks, or D blocks are the same or different.

* * * * *